(12) United States Patent
Wilson et al.

(10) Patent No.: US 8,516,087 B2
(45) Date of Patent: Aug. 20, 2013

(54) HOME AUTOMATION SYSTEM AND METHOD

(75) Inventors: Brian B. Wilson, San Antonio, TX (US); Carlton L. Brownfield, San Antonio, TX (US); Mark B. Hubacher, San Antonio, TX (US); Jason E. Savard, McKinney, TX (US); Mari S. Wul, Boarne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 608 days.

(21) Appl. No.: 11/353,798

(22) Filed: Feb. 14, 2006

(65) Prior Publication Data

US 2007/0192486 A1    Aug. 16, 2007

(51) Int. Cl.
*G06F 15/16* (2006.01)
*G06F 15/177* (2006.01)
*G06F 15/173* (2006.01)
*G06F 3/00* (2006.01)

(52) U.S. Cl.
USPC ........... 709/221; 709/217; 709/220; 709/223; 709/224; 725/37; 725/44; 725/45; 725/46; 725/47

(58) Field of Classification Search
USPC ..................... 709/205, 217–224; 725/78, 37, 725/38, 40, 42, 44–47; 340/3.1; 707/1
See application file for complete search history.

(56) References Cited

U.S. PATENT DOCUMENTS

| | | | |
|---|---|---|---|
| 4,959,713 A * | 9/1990 | Morotomi et al. | 348/156 |
| 6,181,697 B1 * | 1/2001 | Nurenberg et al. | 370/390 |
| 6,198,479 B1 | 3/2001 | Humpleman et al. | |
| 6,580,950 B1 * | 6/2003 | Johnson et al. | 700/17 |
| 6,748,462 B2 * | 6/2004 | Dubil et al. | 710/8 |
| 6,868,292 B2 | 3/2005 | Ficco et al. | |
| 7,260,604 B2 * | 8/2007 | Kuki | 709/205 |
| 8,042,048 B2 * | 10/2011 | Wilson et al. | 715/736 |
| 2001/0034754 A1 * | 10/2001 | Elwahab et al. | 709/201 |
| 2002/0125998 A1 * | 9/2002 | Petite et al. | 340/286.01 |
| 2002/0126201 A1 * | 9/2002 | Schmitt et al. | 348/14.09 |
| 2002/0180579 A1 * | 12/2002 | Nagaoka et al. | 340/3.1 |
| 2003/0005099 A1 * | 1/2003 | Sven et al. | 709/223 |
| 2003/0034898 A1 * | 2/2003 | Shamoon et al. | 340/825.72 |
| 2003/0076341 A1 * | 4/2003 | Kuki | 345/700 |
| 2003/0149973 A1 * | 8/2003 | Kerlefsen | 725/25 |
| 2003/0187920 A1 * | 10/2003 | Redkar | 709/203 |
| 2003/0229900 A1 * | 12/2003 | Reisman | 725/87 |
| 2004/0015619 A1 * | 1/2004 | Brown et al. | 710/19 |
| 2004/0031058 A1 * | 2/2004 | Reisman | 725/112 |
| 2004/0117821 A1 * | 6/2004 | Karaoguz et al. | 725/37 |

(Continued)

*Primary Examiner* — Tae Kim

(74) *Attorney, Agent, or Firm* — G. Michael Roebuck PC

(57) ABSTRACT

In one embodiment a method is disclosed for interacting with a controllable device in an internet protocol television (IPTV) system. The method receives at a control server, device state data for the controllable device from a first client device in the IPTV network; accesses user interface (UI) data from a database accessible to the control server; reflects the device state data in the UI data at the control server; and sends the UI data from an IPTV server to the first client device. In another embodiment a system is disclosed for interacting with a controllable device in an internet protocol television (IPTV) system. The system receives at a control server, device state data for the controllable device from a first client device in the IPTV network; accesses user interface (UI) data from a database at the control server; reflects the device state data in the UI at the control server; and sends the UI from an IPTV server to the first client device.

17 Claims, 16 Drawing Sheets

(56) References Cited

U.S. PATENT DOCUMENTS

| | | | |
|---|---|---|---|
| 2004/0260407 A1* | 12/2004 | Wimsatt | 700/19 |
| 2005/0125425 A1* | 6/2005 | Friedman et al. | 707/100 |
| 2005/0246408 A1* | 11/2005 | Chung | 709/200 |
| 2005/0273522 A1* | 12/2005 | Kohler | 709/250 |
| 2006/0041923 A1* | 2/2006 | McQuaide, Jr. | 725/131 |
| 2006/0064716 A1* | 3/2006 | Sull et al. | 725/37 |
| 2006/0064720 A1* | 3/2006 | Istvan et al. | 725/38 |
| 2006/0123455 A1* | 6/2006 | Pai et al. | 725/133 |
| 2006/0225108 A1* | 10/2006 | Tabassi et al. | 725/100 |
| 2006/0248570 A1* | 11/2006 | Witwer | 725/135 |
| 2006/0259927 A1* | 11/2006 | Acharya et al. | 725/61 |
| 2006/0277569 A1* | 12/2006 | Smith | 725/35 |
| 2006/0293100 A1* | 12/2006 | Walter | 463/30 |
| 2007/0036313 A1* | 2/2007 | White et al. | 379/142.17 |
| 2007/0043687 A1* | 2/2007 | Bodart et al. | 707/1 |
| 2007/0061842 A1* | 3/2007 | Walter et al. | 725/48 |
| 2007/0074245 A1* | 3/2007 | Nyako et al. | 725/34 |
| 2007/0079340 A1* | 4/2007 | McEnroe | 725/78 |
| 2007/0112939 A1* | 5/2007 | Wilson et al. | 709/219 |

* cited by examiner

HOME AUTOMATION SYSTEM AND METHOD

BACKGROUND

1. Field of Disclosure

The disclosure relates to the field of home automation systems.

2. Description of the Related Art

Current home automation systems typically provide a graphical user interface (GUI) a display device, processor, and a remote control to access the home automation system GUI. The GUI is stored locally on the processor to provide access to home automation and security features. Current home automation systems may use elaborate specialized controllers, expensive liquid crystal display (LCD) panels, and media centers that may not be affordable for most homeowners. Many existing home automation systems and controllers use extensive, complex programming only available through onsite or remote service.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

FIG. 16 is a diagrammatic representation of a machine in the form of a computer system within which a set of instructions, when executed, may cause the machine to perform any one or more of the methodologies of the illustrative embodiment.

DETAILED DESCRIPTION OF THE DISCLOSURE

Figure 1:
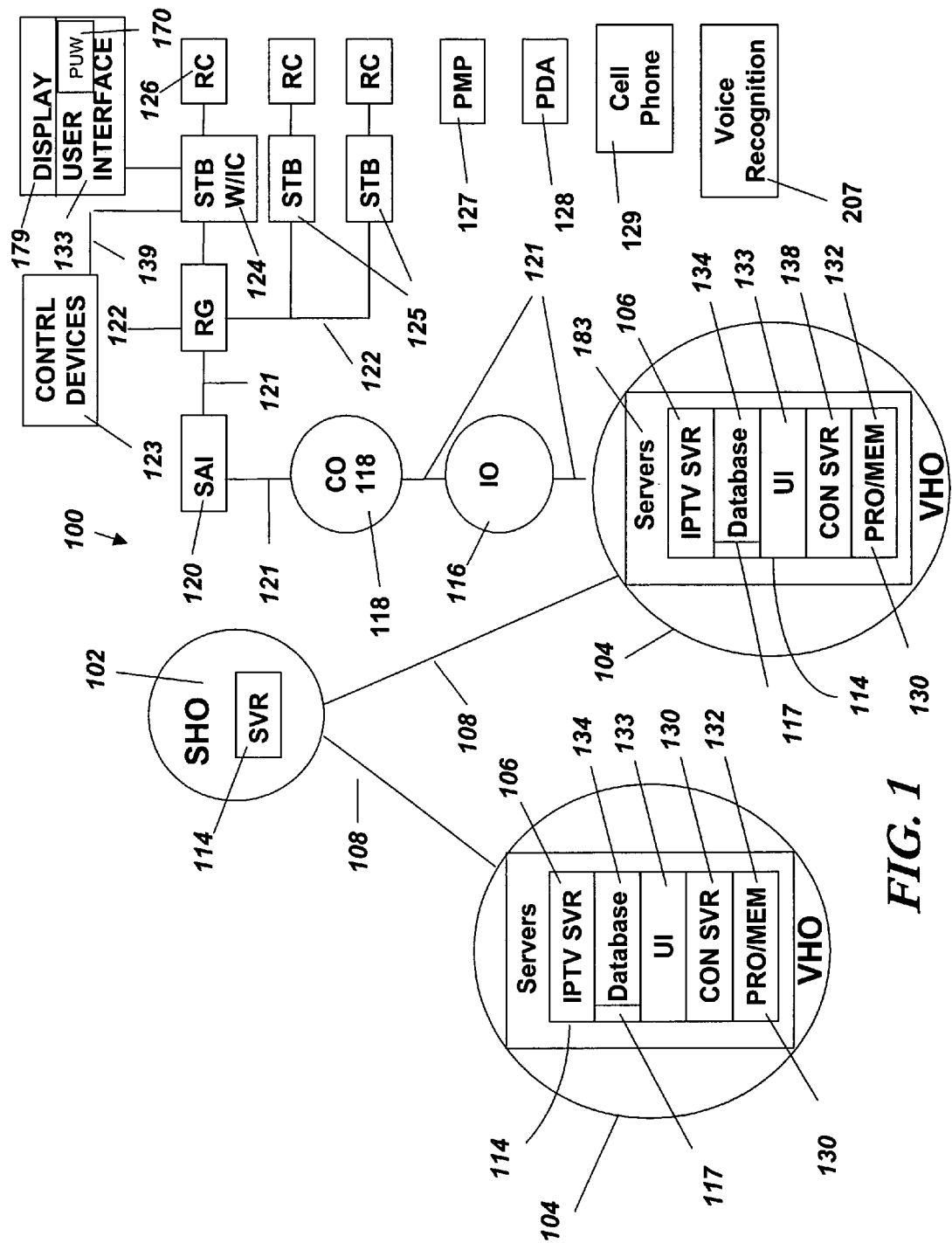
FIG. 1 is a schematic diagram depicting of an illustrative embodiment showing an Internet protocol television (IPTV) network.

In view of the above, an illustrative embodiment is presented through one or more of its various aspects to provide one or more advantages, such as those noted below. In one embodiment a method is presented for configuring device state data for a home automation controllable device including accessing user interface (UI) data from a database at a server, sending the UI data from the server to a client device, receiving data representing a user input to the UI from the client device at the server, configuring the device state data in the database in accordance with the user input, and sending the configured device state data to the client device. The client device may be integrated into a set top box (STB) as shown in FIGS. 1-4 herein. While embodiments dealing with homes are disclosed herein, it should be understood that the techniques are applicable in other environments including but not limited to businesses, schools and other environments wherein consumer electronic devices can be controlled as controllable devices. The STB is integrated with a home automation client (IC described below) that functions as a home automation device controller.

In a particular embodiment a method for interacting with a controllable device in an internet protocol television (IPTV) system is disclosed. The method includes receiving at a control server, device state data for the controllable device from a first client device in the IPTV network, accessing UI data in a database at the control server, representing the device state data in the UI data at the control server, and sending the UI data from an IPTV server to the first client device. In another aspect of a particular embodiment the method further includes sending the UI data from the control server to a second client device. In another aspect of a particular embodiment the method further includes receiving at the control server user input data from the UI at the first client device, configuring the device state data in the database at the control server in accordance with the input, and sending the configured device state data from the server to the first client device.

In another aspect of a particular embodiment the first client device and the second client device are the same device. In another aspect of a particular embodiment the first client device is a set top box (STB) with an integrated client for receiving video and data from the IPTV network. In another aspect of the particular embodiment the controllable device further comprises one of a set consisting of a telephone, home theatre, media server, security system, lighting, heating, ventilation, air conditioning thermostat, video systems, audio systems, window coverings, attic vent fans, automated doors, gates, locks, energy management system, automated fountain, water heaters, sprinklers, pools, spas, video cameras, automated appliances, water leakage, vehicle detection systems, hurricane shutters, security shutters, weather station, utility monitoring devices, automated fireplaces and automated ceiling fans.

In another aspect of a particular embodiment the method further includes sending content, UI data and home automation data from an IPTV server to the first client device wherein the content is one selected from the set consisting of audio, video, text icons, pop up windows and control state. A client device may receive video content data such as entertainment programming and client generated video such as surveillance video data from a home security camera.

In another aspect of a particular embodiment the method further includes sending the content and the device state data to the second client device. In another aspect of a particular embodiment the method further includes receiving video data from the first client device and sending the video data to the second client device.

In another particular embodiment a system for configuring a device state is disclosed. The system includes a database for storing device state data for a controllable device and a control server coupled to the database. The server includes a first control server interface to send UI data from the server to a client device, a second server interface to send the UI data from the server to a client device, a third server interface to receive user input data from the client device at the server to configure the device state in the database server in accordance with the input, and a fourth server interface to send the configured device state from the server to the client device.

In another aspect of a particular embodiment the system includes a fourth server interface to the server to apply a business rule to the input data and a context data. In another particular embodiment a method of configure a device state of a home automation controllable device in an IPTV network is disclosed. The method further includes obtaining at a client device, device state data for a plurality of controllable devices associated with the client device, sending the device state data to a control server, sending user input data from the client device to the server for configuring the device state in a server database in accordance with the input, and receiving from an IPTV server at the client device, a UI reflecting the configured device state.

In another aspect of a particular embodiment the method further includes receiving video at the client device from the IPTV network. In another aspect of a particular embodiment the method further includes displaying the UI along with the video.

In another aspect of a particular embodiment the method a home automation controllable device further comprises one of a set consisting of a telephone, media server, security system, lighting, ventilation, air conditioning thermostat, video systems, audio systems, window coverings, attic vent fans, automated doors, gates, locks, energy management system, automated fountain, water heaters, sprinklers, pools, spas, video cameras, automated appliances, water leakage, vehicle detection systems, hurricane shutters, security shutters, weather station, utility monitoring devices, automated fireplaces and automated ceiling fans.

In another aspect of a particular embodiment the method further includes sending video data to the IPTV server and sending the video data from the IPTV server to a monitoring service such as fire, police or a private monitoring service.

In another particular embodiment a system for configuring a device state of a home automation controllable device is disclosed. The system includes a client device. The client device further includes a processor, a first processor interface to receive UI data from a server at the client device, a second processor interface to send a user input to the UI data from the client device to the server to configure the device state data at the server in the database at the server in accordance with the input, and a third processor interface to receive the configured device state from the server at the client device.

In a particular embodiment the method includes a user input which may be a UI input selection to turn on or off a controllable device, a business rule, an event, a content selection, a context and a device state. The UI may be an Internet protocol television (IPTV) UI. In another particular embodiment the method includes applying a business rule to the input data and a context. In another particular embodiment the context includes at least one selected from the set consisting of a scheduled content time, content characterization, event, and event participant. In another particular embodiment the method includes sending content to the client device. In another particular embodiment the method includes reporting context data to a data base and sending global data messages to the client based on the reported context data.

In another particular embodiment a database is provided for storing a device states data, context data and business rules data. A server is coupled to the database, a first server interface is provided to send UI data from the server to a client device, a second server interface is provided to access UI data in the database, a third server interface is provided to send the UI to a client device, a fourth server interface is provided to receive a user input data from the client device at the server, and a fourth interface is provided to configure the device state data in the database server in accordance with the input, and a fifth server interface is provided to send the configured device state data to the client device.

In another particular embodiment the input data is selected from one of the set consisting of a UI input data, business rule data, event data, video content selection data, context data and device state data. The UI data comprises formatting data, device state data for presentation of the UI on the client devices. The control server reformats the UI data for presentation on further can be presented in a UI format stored in the data base, such as an Internet protocol television (IPTV) UI format. The formatting UI data and the UI data representing the device state data are stored in the data base and are accessible to all servers. The UI data can contain a format for presenting can be formatted for presentation on a PDA, cell phone or PC. In another particular embodiment a business rule is applied to the input data and a context data. In another particular embodiment the context data can include but is not limited to scheduled video content time, video content characterization, event, and event participant. In another particular embodiment a server interface is provided to send video content data to the client device, to report context data to a database and to send global message data to the client based on the reported context data.

In another aspect of a particular embodiment a data structure is presented for storing device state data of a home automation controllable device having a device identifier field for containing data identifying a device in the device state, a device mode field for storing data representing an operational mode for the device, and a context field for storing data representing a context. In another particular embodiment the database includes but is not limited to a business rule field for storing data representing a business rule for application to the context data and the input data.

In another particular embodiment a method of configuring device state data of a home automation controllable device is disclosed and includes receiving UI data from a server at a client device, sending data input from the client device to the server for configuring the device state data in the database in accordance with the input data, and receiving the configured device state in accordance with the device state data at the client device.

In another particular embodiment the input data is at least one of the set consisting of a UI data, UI input, business rule data, event data, video content selection data, context data and device state data. In another particular embodiment the UI further can be an Internet protocol television (IPTV) UI. In another particular embodiment the method includes receiving content data from the server at the client device, sending context data from the client device to the database and receiving global message data at the client based on the reported context data.

In another particular embodiment a system for configuring device state data of a home automation system controllable device is disclosed having a database for storing a plurality of device states data, context data and business rules data. In another particular embodiment structure is presented for storing device state data in a database having a device identifier field for storing data representing a device in the device state, a device mode field for storing data representing an operational mode for the device, and a context field for storing a context. In another particular embodiment the database includes but is not limited to a business rule field for storing data representing a business rule for application to the context and an input. In another particular embodiment a server is coupled to the database wherein the server has a processor, a computer readable medium coupled to the processor, a computer program embedded in the computer readable medium, the computer program having instructions to receive UI data from a server at a client device, instructions to receive the input from the client device from the server, to configure the device state in the database at the server in accordance with the input, and instructions to receive the configured device state data at the client device.

In a particular illustrative embodiment a home automation system is provided to configure controlled devices in a home. A particular illustrative embodiment includes but is not limited to a client device such as a set-top box (STB) with an integrated client (IC) for monitoring and controlling a device state for a group of controllable devices for performing home automation. The terms STB and IC are used interchangeably herein to mean an STB with IC. The IC can communicate through any suitable gateway, such as an integrated residential gateway (RG) to access a server hosting an internet protocol television (IPTV) server. The term IPTV is used herein to mean a digitized television signal set over a digital network such as the Internet, that is television over internet protocol (TVoIP). As an example of TVoIP, the IPTV example of the illustrative embodiment is used as an non limiting example of an illustrative embodiment system for providing TVoIP or IPTV. IPTV is not intended to limit the disclosure to any specific implementation of a system for providing digital television and video delivered over the internet or TVoIP. The terms IPTV and TVoIP are used herein interchangeably. Microsoft Corporation has a project referred to as IPTV which is intended to deliver digital television over the Internet; however, this description or disclosure is not limited to any particular vendor's implementation of IPTV or TVoIP, including but not limited to Microsoft's implementation of digital television delivered over the internet.

A residential gateway, RG is shown in an illustrative embodiment, however, any gateway that provides communication between the IC and the servers 106, 138, 114 and 133, is suitable, including but not limited to commercial, industrial, multiple dwelling unit and office gateways. An IPTV UI data for formatting the UI at a client and presentation of device state data and home automation data at the client is stored at a database accessible to an IPTV server 106. Home automation controllable devices 123 (herein after "controllable devices") operational states are represented in a device state data structure stored in a database at a control server 138. The IC monitors and receives the device state data from the control server for all controllable devices in a home. The IC controls the controllable devices setting them to the device settings in the device state data.

The IC communicates with the IPTV server and control server through an integrated interface or through an interface such as RG 122. The RG 122 can be integrated into IC (STB) 124. The device state for the controllable devices can be configured and controlled by a subscriber through the UI. The UI may be displayed on a television set or a computer through the RG or STB or at remote devices away from the home, such as all phone, PDA and laptop. Multiple UI formats and device state data sets for a number of client devices are stored in the data base. Thus the UI can be sent to multiple clients and the device state data presented on multiple clients. The UI format for a cell phone could be different the format for a television or PC. The device state data presented in the UI format may change between client devices. The UI enables a subscriber to control the operational state of existing home automation controllers, devices, and security systems from a client device such as the IC or a remote cell phone. The client devices also receive IPTV video content and device monitoring data and video streams.

In an illustrative embodiment the IC communicates with the existing controllable devices in the home through a wireless network using wireless protocols or through existing home wiring, or power-line technology, such as Home-Plug and UPB, other communication networks and protocols can be used including X10, Zigbee, ultra wide band (UWB) and Insteon. The IC controls the states of the controllable devices according to the device state data by sending control commands to the controllable devices to turn on lights or stream video data from a front porch video camera when the door bell rings.

A system according to the illustrative embodiment can be in-expensively installed and thus is affordable to the average homeowner. The home automation system of the illustrative embodiment can save consumers thousands of dollars in installation costs compared to installation of elaborate home automation systems. The illustrative embodiment is network based and thus enables transparent software upgrades and remote service transparent to a subscriber enabling service without disrupting a subscriber's household for maintenance and upgrades. The illustrative embodiment provides an easy, convenient method for home automation, content selection and security. Home automation programming is provided through simplified UI control at the server with built-in computer program applications. The illustrative embodiment provides server based computer programs that can provide reporting, analysis, performance, environmental control and evaluation of usage of controllable devices.

The illustrative embodiment provides an IPTV and control server based home automation system. UI data is provided that resides on a database accessible to the control server 138 and the IPTV server 106. An IC and user remote control (RC) are provided to enable the user to use the RC to provide input to and communicate with the UI through the IC to alter UI data and the device state data. The UI data is displayed on an IPTV UI format display such as on a television or on a mobile display device such as a cell phone. A subscriber can conveniently access the UI data through the formatted UI presentation of the UI data on a display screen to control home automation and content from the comfort of their home sofa or from a remote location via a laptop computer, cell phone or PDA. The UI can be accessed from the IC via an integrated RG through any STB or television RC location in the home. The UI can also be accessed remotely through the control server by remote devices through Wi-Fi, local or remote wireless networks. The UI data can be accessed by numerous other client devices in and away from the home including but not limited to personal media players (PMP), advanced remote controls, LCD's, lap-top computers, personal computers, and verbal input through a voice recognition system.

The control server 138 processes remote device user input data from a UI presented at the remote device and communicates the data to the IPTV server, control and IC per the input data. UI input from a remote device are reflected in the UI and the device state. For example, a user at a cell phone can request turning on the heat at a cell phone UI. The control server accepts the UI input from and changes the device state in the data base to turn on the heat. The control server sends the new device state to the IC and formats the UI to reflect the change in the device state. The control server sends a message to the IPTV server to send the reformatted UI data for the new device state and device state data to the IC for display as a UI screen at the client device. Remote devices communicate with the control server, IPTV server and data base via messages with the control server 138 and send data to and from with control server 138. The IC sends device states read from the controllable devices directly to the control server and the control server sends device states for controlling the controllable devices directly to the IC. Programming the home automation system is simplified as it is initially preconfigured with serviceable default computer programs.

Data representing a device state of the home automation controllable devices (hereinafter "device state") is stored in a database at or accessible to the control server. The device state represents an operational state for each controllable device in the home. The device state data can be configured to set controllable devices in various operational states including but not limited to, on, off, variable power or dimmer setting, volume settings, flicker, video streaming data, etc. The device state data and associated device state for controllable devices in the home can be configured using a UI iconic representation of the home controllable devices appearing in a house floor plan. In an illustrative embodiment, device states can be learned in "context". Learning a device state in context is performed by instructing the IC to learn, that is, capture and store a particular device state data and context data representing a set of current controllable device settings (device state) for current or future context data. For example, a subscriber may configure controllable devices manually or via the UI, to set the lights down, turn the television volume up and mute the telephones in his home as he (subscriber "dad") is watching Monday Night Football. Dad may use the UI to instruct the IC in an illustrative embodiment to learn the device state and context for a subscriber dad watching Monday Night Football. The IC monitors and sends the device state data to the control server for storage in the database at the control server for application of business rules to the device state and context data. The IPTV server or control can associate this device state data in the data base with a context to generate a business application of a business rule. Thus, next time dad is watching Monday night football the business rule will see that dad is watching Monday night football and send the learned device state data to the IC to set the device state in the controllable devices.

In an illustrative embodiment, a server database is provided for storing the device states data. The device states data can be manipulated by accessing the UI. The UI resides off-site in the IPTV network server database for on-going software updates and programming. Dedicated STB remote buttons are provided for macros, such as all home lights mode on or panic mode, such as all lights flashing during an intrusion or breach of security. In this case an intrusion alert from the IC can be sent to neighbor homes over the IPTV network and to a security monitoring agency such as police, fire and emergency medical. An advanced IC remote control (RC) is provided for user input to the UI to access and interact with additional features and controls including but not limited to intelligent management for energy savings, home theatre control, security control and more.

In one particular embodiment, IC communication interfaces are provided to existing home automation or security systems. In an illustrative embodiment the IC can communicate over existing home wiring using power-line or wireless technologies for changing the state of controllable devices by controlling the devices according to the device state. Controllable devices can be monitored and their device state controlled, that is, the devices can be turned on and off, variably controlled as to direction, speed and power. The illustrative embodiment provides a database for storing business rules data, content data, context data and device states data. The business rules are applied to the content, device state data and context data to reconfigure the device states in the database which are sent to the IC for setting a device state in the controllable devices, for example, in a home or business.

In a particular embodiment a user can access the UI data to communicate with an STB with IC having a digital video recorder (DVR) and a media server containing video, music, photos, etc. Home automation system reporting and analysis is provided at the control server by the home automation system.

Reporting includes reporting data to the control server through the IC on device performance, environmental factors and device usage. Usage reporting can be conducted on or by individual devices or appliances in the home including but not limited to devices such as, refrigerators, air conditioners, swimming pools and lights. Reporting can be tied to content data or context data. For example, refrigerator contents data can be inventoried by user interaction with the UI, such as verbal announcement to the voice recognition system or by scanning in by bar code identifying products like in a supermarket checkout line and reported to subscriber on demand. A business rule may be configured to monitor IPTV content data and display refrigerator contents data when a commercial break is encountered during a football game. Washers, dryers, microwaves, heating/cooling, and pool/hot-tub usage, can be monitored, reported and controlled. A particular embodiment can provide business rules to use weather stations reports to the control server to provide weather related home automation features to change the device state to control shutters during high winds, blinds synchronized with the sun, sprinklers run according to recent cumulative rainfall, windows/ventilation systems, and temperature and humidity control to optimize energy efficiencies.

In another particular embodiment an STB with integrated client for Home and Media Controller (hereafter referred to as "IC" and used interchangeably with STB to mean an STB with integrated home and media controller) is provided. The IC provides an IP based home automation solution that integrates content (entertainment video and RDP applications) with advanced home automation control features. IC automation features include but are not limited to controlling lighting, security, surveillance, temperature, energy management. Video content related controls include but are not limited to home theater control, diagnostics and reporting capabilities. The IC control seamlessly integrates advanced home theater control and home automation control using standard IR, IP, RF, wireless and power line communication protocols. The IC can be integrated into an STB which can include but is not limited to an STB used for decoding CATV, IPTV, and/or Satellite video applications. The IC leverages existing STB functionality and connectivity to consumer A/V electronics including access to personal media content such as internal/external digital video recorder (DVR), personal video recorder (PVR), PMP or storage devices and personal computers.

An IC is described in the illustrative embodiment which is capable of providing home automation control, and audio/visual (A/V) control and content control to any room in the home through the IC and a home communication network. In an illustrative embodiment, the IC integrates infrared (IR), IEEE 1394, RS-232, radio frequency (RF), component video, composite video, S-video, DVI, HDMI, optical, Ethernet, RJ-11, audio in/out, video in/out, and speaker out connectivity to the home theater consumer electronics equipment.

In an illustrative embodiment, the IC communicates to other STB's and home automation devices throughout the home using communication networks including but not limited to a wireless mess network, Ethernet, Wi-Fi, Zigbee or power line distribution methods including but not limited to Zwave, universal power bus (UPB), and Insteon protocol. The IC also communicates with and controls, sensors, detectors, thermostats, outlet dimmers, outlet switches, smoke detectors, fire detection systems, video cameras, carbon monoxide detectors, contacts, proximity sensors, security systems, gas detection devices, irrigation equipment, energy measurement, load control, air conditioning, humidity control, heating equipment, dimmer switches, switches, smart appliances, pool/spa, home theater, shades, blinds, drapes, projection screens, mounts, lifts, fan speed, remote dimmers, etc. The IC can be accessed and controlled by remote controls, remote wireless devices, touch pads, key pads, LCD's, key fobs, PDA's, PMP's, Cell Phones, computers, etc. The IC may access an IPTV GUI and to request to receive a device state from the control server to configure controlled devices in the home according to the device state.

Turning now to FIG. 1, FIG. 1 is a schematic diagram depicting an IPTV network 100 in accordance with an illustrative embodiment. As shown in FIG. 1, the IPTV network 100 includes but is not limited to a super hub office (SHO) 102 for acquisition and encoding of information and data such as video content; a video hub office (VHO) 104 in each demographic market area (DMA) for delivery of the content; intermediate offices (IO) 116 and central offices (CO) 118 locations in each metropolitan area for distribution of the content; a service area interface (SAI) access network between the COs and multiple or single dwelling units; and the in-home network with residential gateway (RG) 122. The SHO, VHO, IO and CO may be located in separate geographic regions (nation, region, state, metropolitan, and city) to communicate to subscribers over high-speed digital communication lines 108.

A server 114 can be placed at the SHO 102 to acquire and redistribute content to the VHOs 104 which may be spread across a large geographic region such as a country, such as the United States, England or France. The SHO may be provided in a geographically central location for acquisition of national-level broadcast TV programming. The SHO can be the central point of on-demand video content acquisition and insertion of content into the IPTV network. Video content may include but is not limited to all displayable visual and audio content including movies, games and television programs. Video content can be received at the SHO 102 via satellite and processed for delivery to the VHOs 104. On demand video content can be received from various sources and processed for code/decode and bit-rate requirements for the IPTV network for transmission to the VHOs over high-speed communication links 108. Video content from a SHO server 114 can be redistributed to the VHOs 104 toward the subscriber via the intermediate offices (IOs) 116 and the central offices (COs) 118. The COs are connected to the IOs to further distribute video content toward the subscribers. A subscriber communicates with the IPTV server 106 and the IC 124 communicates with the control server 138 over an IP link 121 between IC 124 and servers 183, IPTV server 106 and control server 138.

The VHOs 104 can receive national content from the SHO 102 video server 114. The VHOs are the video redistribution points within each designated market area (DMA) or geographic region. Application systems, regional subscriber database systems, VOD servers, and fast channel-change servers can be located in the VHO. In a particular illustrative embodiment at least one IPTV server 106 and control server 138 are placed at each VHO server. Each of the servers 114, 106, 138, 183 includes a processor 130, memory 132 coupled to the processor 130, database 134, and GUI 133. The memory 132 can include a computer program that is embedded in the memory 132 that can include logic instructions to perform one or more of the method steps described herein. Additionally the database 134 containing the device control state 117 is coupled to the processor 130.

IPTV subscriber activity data can be collected at the IPTV server 106 from all subscribers associated with a particular server at a VHO and stored in the database 134 for global analysis between multiple IPTV subscribers. Global context and alert messages can be created sent to IPTV subscribers based on a survey of subscriber activity data stored in the database from multiple RGs or IPTV subscribers.

IPTV network content data, video data and messages data, UI data and the device state data is communicated to the IC through a gateway, such as a subscriber IC with integrated RG 122 and can be sent at least partially via either fiber to the node (FTTN) or fiber to the premises (FTTP) optical communication links. In another embodiment, other communication links between the IC and the servers are provided which are suitable including wireless or any other communication mode that may be suitable for transmission of video and data over a communication network including but not limited to an IP network. FTTN equipment, located at communication interface such as a serving area interface (SAI), can be connected to the CO. FTTN equipment may also be located in the CO. Toward the subscriber household, a network interface device (NID) and integrated RG 122 with a built-in very high data rate digital subscriber line (VDSL) modem or optical network termination (ONT) can be installed as the customer premise equipment (CPE).

In one particular embodiment the integrated RG can be connected to the additional STBs 125 in the home via an internal network such as an Ethernet. Each STB has an associated RC 126 which provides user selections and data entry to the UI presented on an STB display 179 to control the IPTV selections and UI from the IPTV platform. Interaction with the control server and UI is also provided at the remote devices. UI interaction and associated home automation device state and information (such as video from a surveillance camera in the home) and data can also be sent to and from remote devices such as but not limited to a PMP 127, PDA 128, cell phone 129 and voice recognition 207 system, through the control server 138. Remote devices can send various types of data to the IC. Video from a mobile cell phone video camera or mobile video camera can be streamed through the control server to the IPTV server and sent to the IC for display in a pop up window display area in the GUI display.

Subscriber activity data from a subscriber, including but not limited to IPTV UI inputs data, device states data, subscriber identification data, alerts data, IPTV channel selection data, IPTV control inputs data and IPTV data entry, is collected from each STB in a household. The subscriber activity data may be collected and transmitted from the RG to an IPTV server 106. Subscriber activity data may also include input to the UI at the IPTV server from a wireless device located outside of the home. In the illustrative embodiment an IPTV server 106 exists in each VHO. The subscriber activity data can be collected periodically at each IPTV server 106 or in real-time from each RG or other suitable communication gateway and stored in the database 134.

In the illustrative embodiment, each IPTV server 106 transmits the subscriber activity data to a single database 134 for global analysis and trending. Global alert messages can be sent, as business rules dictate, for global events such as severe weather, fire, terrorist threats, Amber alerts, and other global or regional events can be sent to IPTV subscribers based on analysis of subscriber activity data collected at the database 134. Thus a fire alert reported in one IPTV subscriber household can be reported to the fire department and neighboring households, including IPTV subscriber households. The database 134 may be a commercial database such as provided by Oracle running on a Sun Microsystems processor. Other processors and database systems are suitable for use with the illustrative embodiment as well.

The IPTV server periodically collects the subscriber activity data from each VHO and stores it in the database. The IPTV server may also operate in real time to collect the data from the VHOs. The subscriber activity data from each VHO is pulled by the IPTV server periodically or can be collected in real time and relayed to the IPTV server. Real time data collection by the control server 138 enables real time data analysis for iterative configuration of the device state, global alert messages and dynamic management of content and home automation from the control server 138. A bank of servers 183 is provided at the VHO, including an IPTV server 106 and a control server 138.

Each of the servers in the bank of servers 183 includes a processor 130, a memory 132 coupled to the processor 130, a database 134, and access to UI 133. In a particular embodiment the memory 132 can include a computer program that is embedded in the memory 132 that can include logic instructions to perform one or more of the method steps described herein. Additionally the database 134 is coupled to the processor 130 containing the device control state 117.

The IC 124, and STBs 125 may forward the subscriber activity data to the RG which in turn sends the subscriber activity data to IPTV server 106 via a communication path 121 between the VHO and an associated RG. Substantially all subscriber activity data including but not limited to content selection, device states, business rules and remote control activity is recorded as subscriber activity data at the IPTV server 106 database. The processor 130 may be implemented as a Sun Microsystems processor. The STB can contain a single microprocessor and memory, or may be implemented as multiple microprocessors and memories located at a single location or at several locations.

A downstream signal from the IPTV server 106 or control server 138 to a RG, display device or IC includes but is not limited to UI data, device states data, and content data for display on the display device associated with the recipient client, such display 170 associated with IC 124. An upstream signal through the RG from the home display device, RG or STB to the IPTV or control server includes but is not limited to events, device state and subscriber activity data including but not limited to channel selections, UI input and any other input from the RC, STB or other remote wireless device with access to the server. The device states data can be communicated directly to the control server 138 for conversion into an IPTV format UI and sent from the IPTV server to the client device as an IPTV UI. The UI shows device states as icons, pictures, graphics text, and can also display video from a remote device or a home controllable device in pop up windows 170 on the UI.

Figure 2:
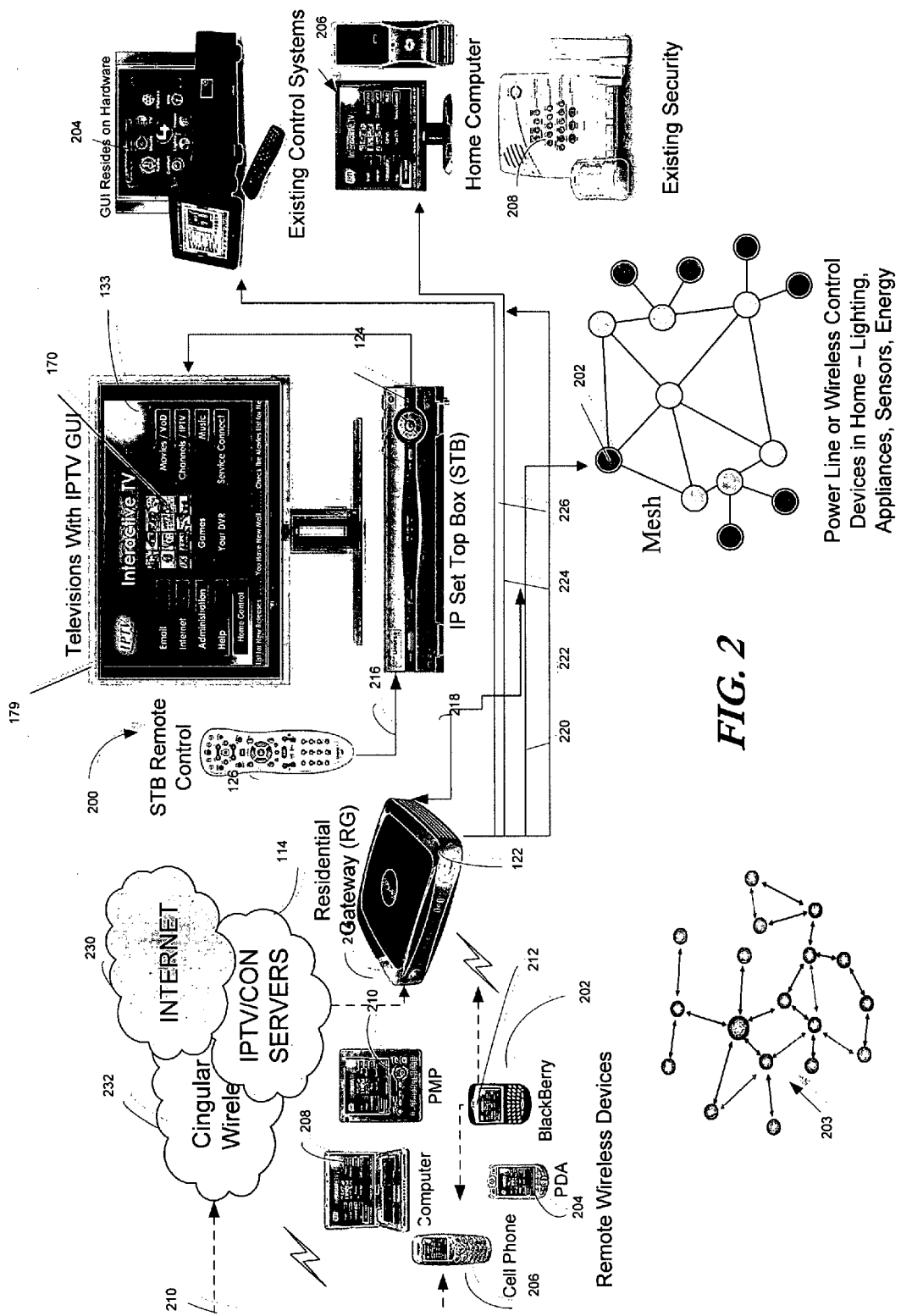
FIG. 2 is a schematic diagram depicting an illustrative embodiment showing a several user interfaces (UI) screen representing device state data and UI data for controlling home automation controllable devices in a home.

Turning now to FIG. 2 in an illustrative embodiment IPTV UI 133 data is provided from the IPTV server 106 to configure the device state 117 data and business rules data in the database 134. The device state data is subsequently sent from the control server to the IC through the RG for controlling controllable devices on a wireless mesh network 202, a power line network 203, existing home security system 208, existing control system 204 or a home computer 206. The subscriber uses the IPTV UI data to interact with the IPTV server 106 and control server 138, which can be installed at the bank of servers 183 in the VHO 104. A subscriber uses a remote control 126 or remote wireless devices mobile email 202, PDA 204, cell phone 206, computer 208, or personal media player 210 to provide input to the UI data at the IPTV server 106 on the servers 183.

The cell phone 206 interfaces or communicates through a wireless network or wired network 232 to the control server 138. The remote wireless devices interface to the control server through wireless link 212. The IPTV server 106 interfaces with the RG 122 over a network link 214. The RG communicates with an IC 124 over communication link 218. The RC 126 communicates with the IC 124 over communication link 216. The RG communicates with the wireless mesh network and the power line network 202 over communication link 220. The RG communicates with existing home security over communication link 222. The RG communicates with the home computer system 206 over communication link 224. The RG communicates with the existing control system over communication link 226.

Figure 3:
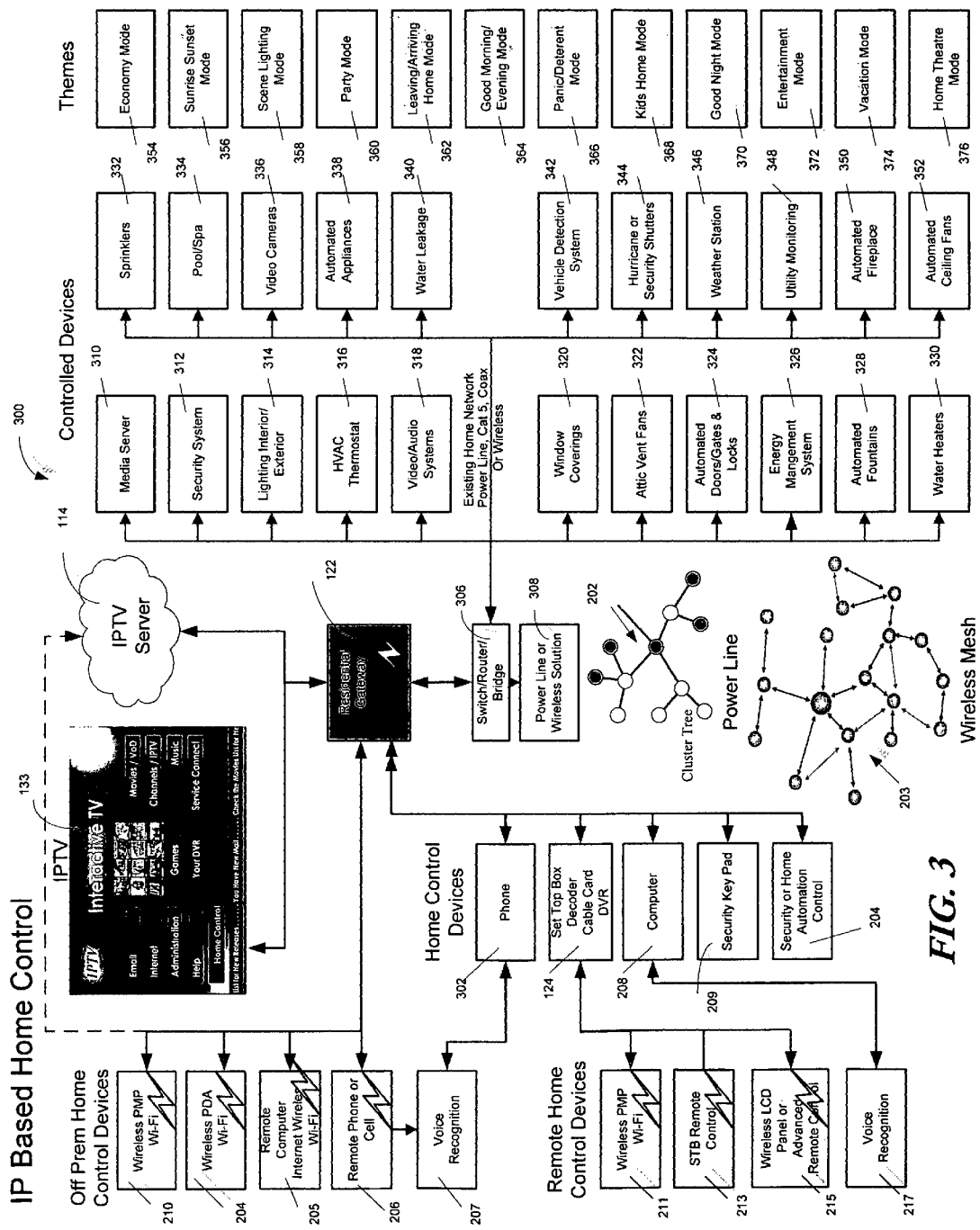
FIG. 3 is a schematic diagram depicting an illustrative embodiment showing a network of controllable devices for home automation.

Turning now to FIG. 3, in an illustrative embodiment the IPTV UI 133 is accessible for viewing and input from all premise home control devices including but not limited to, wireless personal media player WIFI device 210, wireless PDA WIFI device 204, remote computer internet wireless WIFI device 205, and remote phone or cell phone 206. The UI is presented in a display 179. Pop up windows 170 can be created the UI data and/or device state data to stream video or the UI data to a pop up window 170 section in the UI 133. A voice recognition system 207 in conjunction with a cell phone, or wireless telephone may also access a verbally announced version of the UI 133 to select appropriate control states and configure business rules to be applied to a device state and context. Controllable devices and remote control home devices proximate to the IC may communicate with each other to communicate with the IC. Remote devices not in direct communication with the IC communicate with the IC through the control server and the IPTV server. The GUI can be verbally announced over a telephone and requested input received over the telephone through the voice recognition system. Remote home control devices can also access a STB decoder or cable card 124 to access the RG and IPTV UI to select content or configure the device state 117 and business rules.

Remote control home devices can include but are not limited to a wireless personal media player (PMP) 211, STB remote control 213, and a wireless LCD panel or advanced remote control 215. A voice recognition system 217 is also provided to interface with the control server or computer 208 microphone or other audio input devices such as a telephone. The IC 124 communicates with home control devices 302 phone, set top box decoder cable card DVR 124, computer 208, security keypad 209, and security or home automation control 204. The IC 124 also communicates with a switch/router/bridge 306 and a power line or wireless solution interface 308. The power line or wireless solution interface 308 communicates with the power line cluster tree 202 and the wireless mesh network 203. The switch/router/bridge 306 provides communications between the residential gateway and controllable devices.

The controllable devices 123 (home automation controllable devices) may include, but are not limited to a media server 310, security system 312, lighting interior/exterior 314, heating, ventilation and heating, ventilation and air conditioning (HVAC) thermostat 316, video/audio systems 318, window coverings 320, attic vent fans 322, automated doors/gates and locks 324, energy management system 326, automated fountain 328, water heaters 330, sprinklers 332, pools/spas 334, video cameras 336, automated appliances 338, water leakage 340, vehicle detection systems 342, hurricane or security shutters 344, weather station 346, utility monitoring devices 348, automated fireplaces 350, and automated ceiling fans 352.

The control devices can be configured to implement particular themes or aggregated device states according to context, content and the business rules stored in the database. Themes or device states can be associated with particular user content, time of day, and context. Context may include but is not limited to a combination of subscriber or event participant identification, global alert context from the database, time, current or scheduled content and other associated events. Associated events include but are not limited to arrival, departure, alarm state, calendar, weather, holiday, global events, etc. Themes consist of but are not limited to economy mode 354, sunrise sunset mode 356, scene lighting mode 358, party mode 360, leaving/arriving home mode 362, good morning/evening mode 364, panic/deterrent mode 366, kids home mode 368, good night mode 370, entertainment mode 372, vacation mode 374, and home theater mode 376. A global alarm state may override a theme to interrupt a muted setting where phones and TVs are turned off to send a phone and TV alert to a subscriber.

Figure 4:
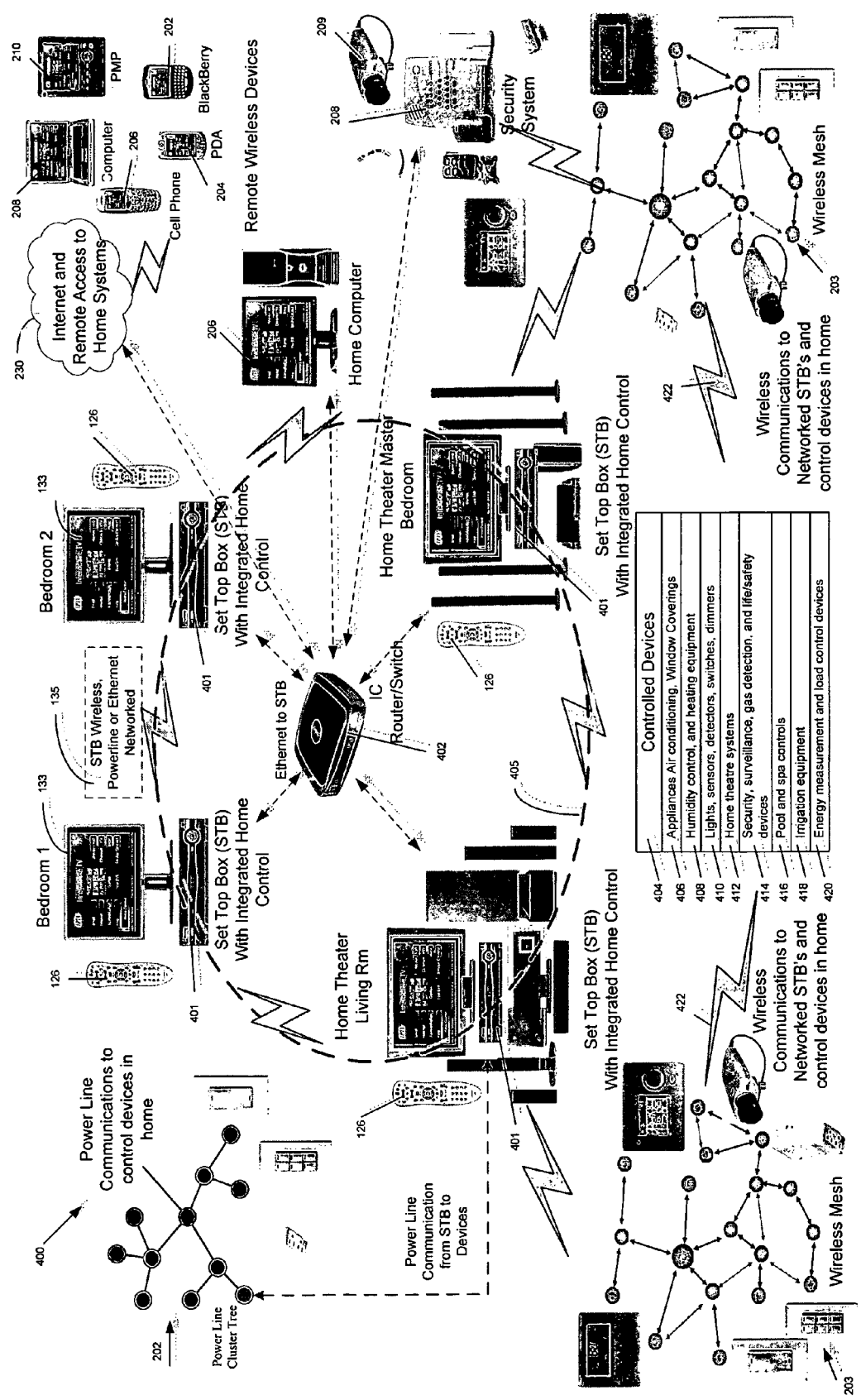
FIG. 4 is a schematic diagram depicting a particular illustrative embodiment showing a Set-top Box (STB) with integrated home and media controller in communication with controllable devices for home automation in a home.

Turning now to FIG. 4 in a particular illustrative embodiment a router/switch device 402 communicates with the IC 401 on an STB with integrated home control. The IC 401 receives a device state from the IPTV network server 114 and communicates the control state to devices in the home on a wireless network, over power lines or an Ethernet network 405. The device state includes but is not limited to home theater control settings associated with home theater content.

Devices or utilities controlled by or communicated with by the STB or IC include but are not limited to other STBs or ICs 401, a power line cluster tree 202, a wireless mesh network 203, the existing security system 208, home computer 206, and internet access to home systems 230 including home computer 208, personal media player 210, cell phone 206, PDS personal data assistant 204, and mobile email device 202. The wireless mesh network communicates to network STBs and controllable devices 123 in the home. The controllable devices 123 include but are not limited to appliances, air conditioning and window coverings 406, humidity control and heating equipment 408, light sensors, detector switches and dimmers 410, home theater systems 412, security surveillance, guest detection and lights/safety devices 414, pool and spa controls 416, irrigation equipment 418, and energy measurement and load control devices 420.

Figure 5:
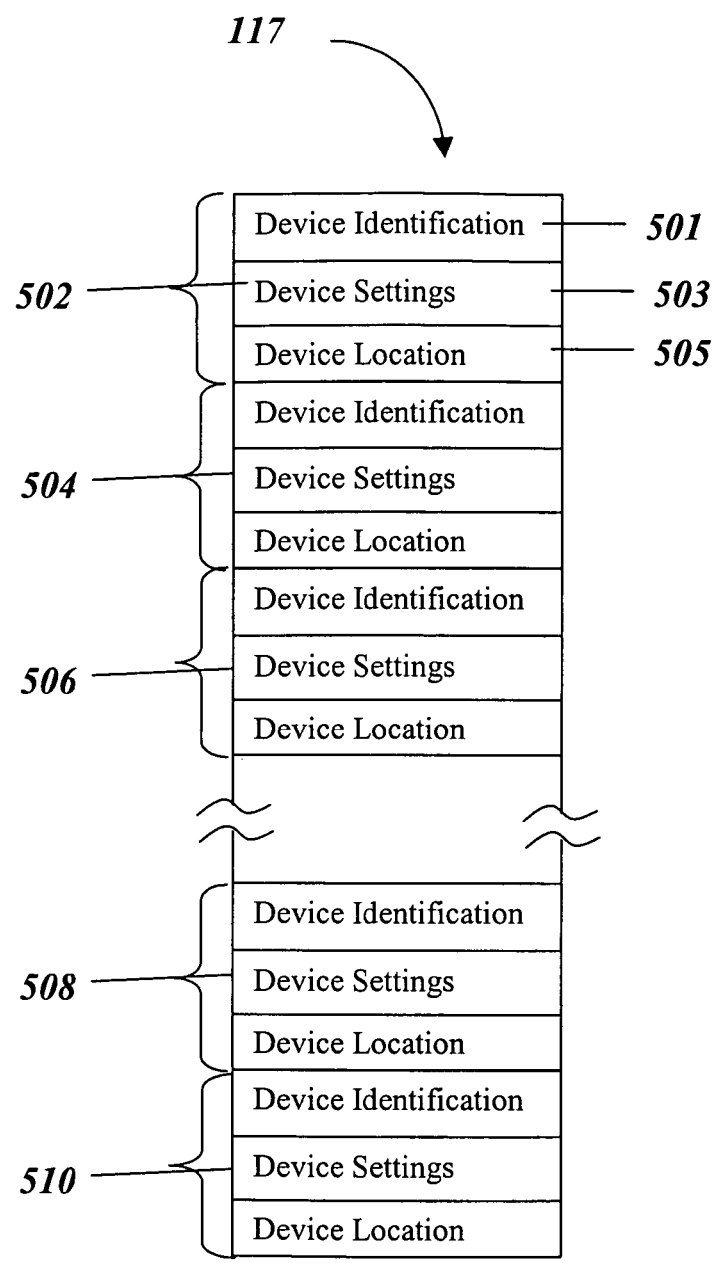
FIG. 5 is an illustration of a data structure for storing a device state in an illustrative embodiment.

Turning now to FIG. 5, FIG. 5 illustrates a data structure 117 for representing the configuration of a device state of the home automation controllable devices. A set of data structure fields is shown associated with the controlled devices represented in the device state. There can be multiple instances of each controlled device associated with a unique identifier in the data structure for uniquely representing multiple controlled devices in the device state.

Additional fields can be added to represent additional controlled devices. The device state is defined by fields in the data structure. Each device in a home is defined by a group 502 of device state definition fields. Each group 502, 504, 506, 508 of device state definition fields includes but is not limited to a device identification field 501 for storing device identification data, a device settings field 503 for storing device settings data for the device identified and a device location field 505 for storing data representing the device location. A device state is defined by a collection of the device state data in the data structure for all devices in a home having an IC. The IC in the illustrative embodiment performs as a home automation system. Device state data may include an alert message such as a global or security alert message stored in the device setting field 503 to be announced over an audio device or displayed on a display device.

Figure 6:
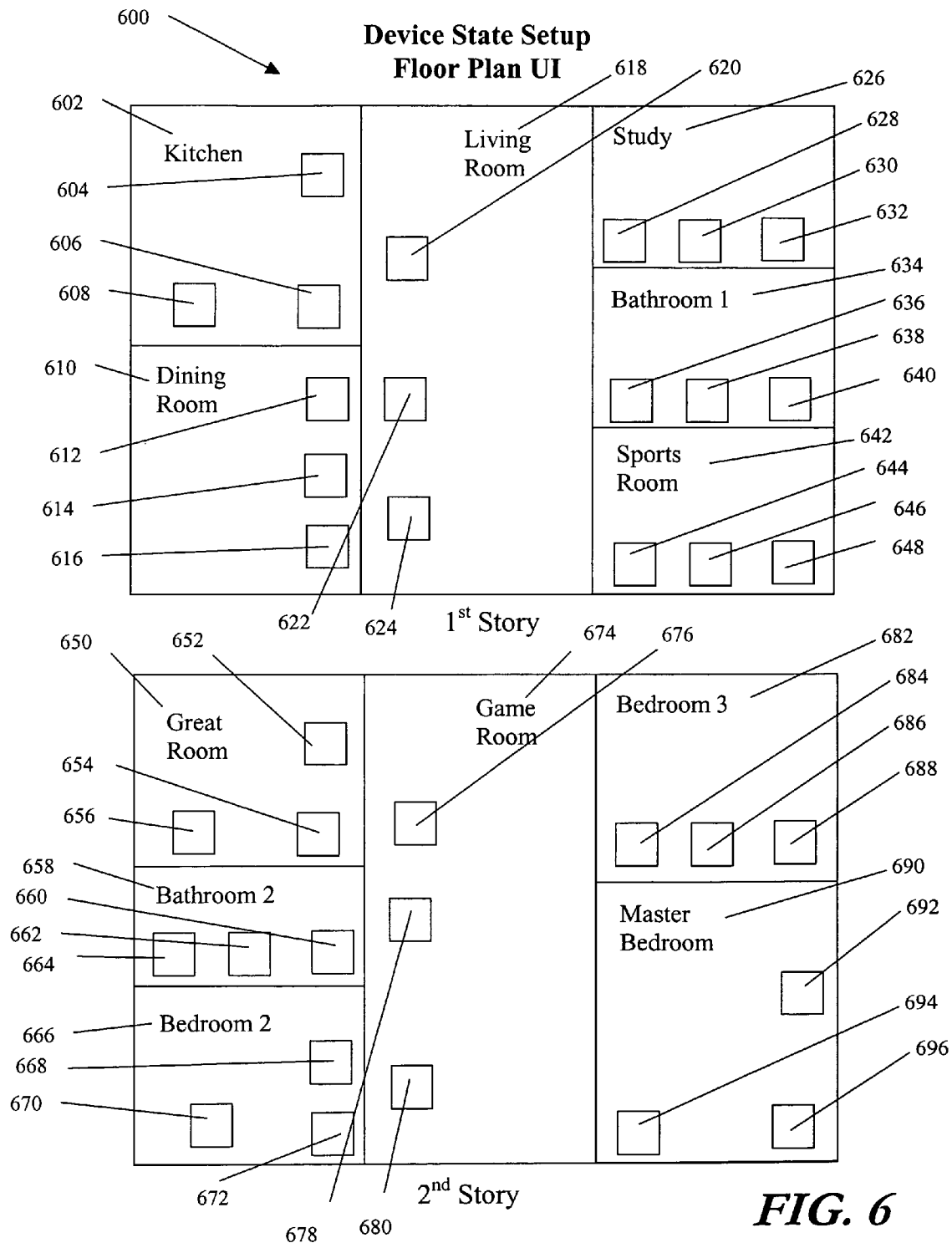
FIG. 6 is an illustration of an iconic representation of a device state for a home in a particular illustrative embodiment.

Turning now to FIG. 6, FIG. 6 is an iconic representation of the home control devices appearing in the UI. Home automation controllable devices are represented by as device icons. User input data to the UI can be performed by a RC and moving a cursor over the UI. The user input data is sent to the IPTV server or control server by the IC. User input to the IC UI is accomplished placing a cursor on a device icon and right clicking, the device operational mode can be selected and stored in the device state data structure device setting field 503. Kitchen 602 controllable devices 604, 606, 608 represent but are not limited to devices such as microwave ovens, coffee pots, ovens, televisions, lights, phones, etc. Dining room 610 controllable devices 612, 614, 616 represent but are not limited to devices such as televisions, lights, radios, phones, etc. Living room 618 controllable devices 620, 622, 624 represent but are not limited to devices such as televisions, lights, stereos, DVD players, game systems, phones, etc. Study 626 controllable devices 628, 630, 632 represent but are not limited to devices such as personal computers, lights, fax machines, printers, phones, etc.

Bathroom 1 634 controllable devices 636, 638, 640 represent but are not limited to devices such as radios, lights, televisions, phones, etc. Sports room 642 controllable devices 644, 646, 648 represent but are not limited to devices such as lights, radios, televisions, satellite systems, DVD players, phones, etc. Great room 650 controllable devices 652, 654, 656 represent but are not limited to devices such as lights, televisions, stereos, DVD players, phones, etc. Bathroom 2 658 controllable devices 660, 662, 664 represent but are not limited to devices such as lights, televisions, radios, phones, etc. Bedroom 2 666 controllable devices 668, 670, 672 represent but are not limited to devices such as lights, televisions, stereos, DVD players, satellite systems, phones, etc.

Game room 674 controllable devices 676, 678, 680 represent but are not limited to devices such as lights, televisions, stereos, DVD players, satellite systems, phones, personal computers, etc. Bedroom 3 682 controllable devices 684, 686, 688 represent but are not limited to devices such as lights, televisions, stereos, DVD players, satellite systems, phones, etc. Master bedroom 690 controllable devices 692, 694, 696 represent but are not limited to devices such as lights, televisions, stereos, DVD players, satellite systems, phones, etc.

Figure 7:
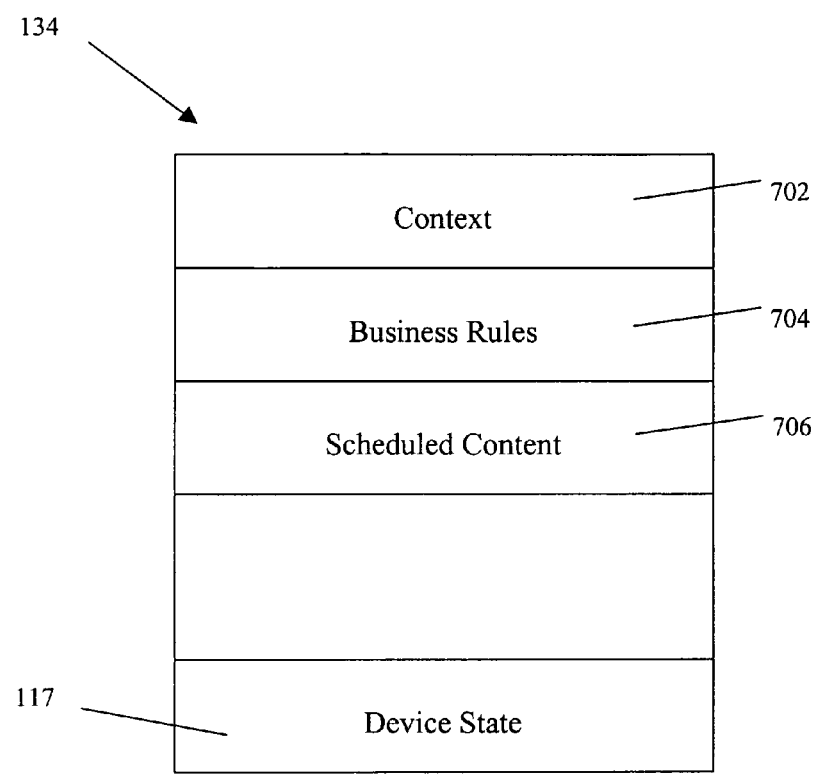
FIG. 7 is an illustration of a database for containing device state data and UI data in an illustrative embodiment.

Turning now to FIG. 7, FIG. 7 is a schematic diagram of a database in accordance with a particular illustrative embodiment. An illustrative embodiment database includes but is not limited to context data at 702, business rules 704 data, scheduled content data 706, and the device state data 117. The database contains the business rules data accessible to a processor for configuration of the device state data 117. The device state data 117 may be associated with a particular theme. The theme may be associated with a particular context data 702. Thus, a subscriber may select a device state, configuring the lights and the control device, etc. in this house for a particular context (i.e. subscriber is dad; time Monday 8 pm, October, content is Monday Night Football). The context may also include parameters such as an event and event participant such as children arriving home from school. When the children enter the home their unique alarm code to the home security system identifies them as the kids arriving. If the time is between 3-5 pm, the home automation system through the IC can lock out access to television and computer games to enforce children doing their homework.

Figure 8:
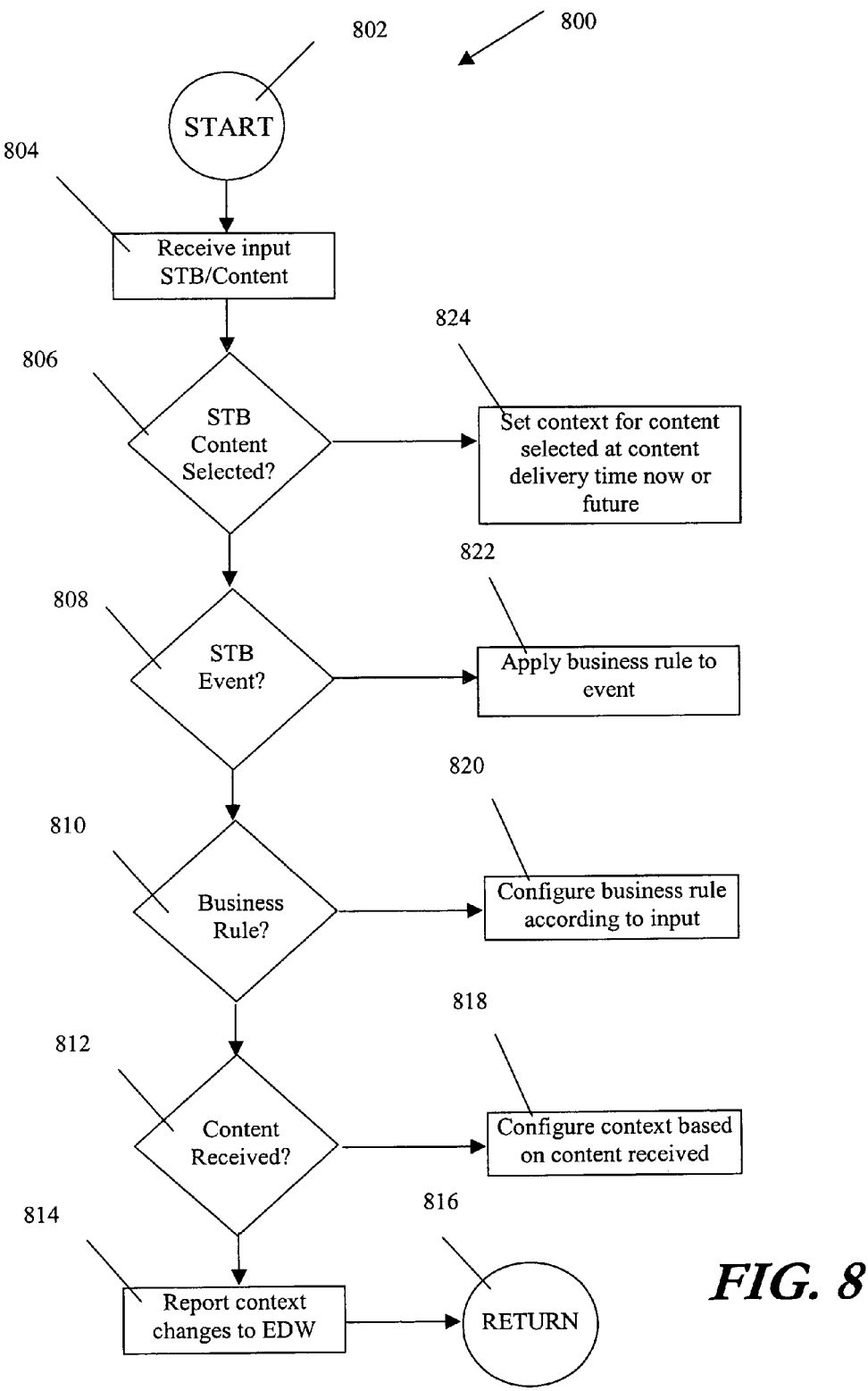
FIGS. 8-12 are flow charts illustrating methods performed in an illustrative embodiment.

Turning now to FIG. 8, FIG. 8 is a diagrammatic flow chart representation of a method performed by a computer system in accordance with a particular illustrative embodiment. The scenario starts at 802, as the server receives input STB/Content at 804. It is determined whether STB input (STB input is used herein as synonymous with subscriber input) or content is received at block 806. Whether an input or STB event is received is determined at block 808, whether a business rule is received is determined at block 810, whether content is received is determined at block 812. The method then reports context changes to the IPTV server at block 814 and then returns at block 816. When STB/Content block 806 is received, the context is set for content selected at content delivery time either now or at a future time at block 824. Block 824 is described in more detail in FIG. 9. When an event 808 is input, a business rule is applied to event 822. Block 822 is described in more detail in FIG. 10. When business rule 810 is received the business rule is configured according to input 820. Block 820 is described in more detail in FIG. 11. When content is received at block 812 as an input, the context is configured based on the nature of the content received at block 818. Block 818 is described in more detail in FIG. 12. The nature of the content includes content characterization (sports, news, movies, title, type, etc.) and program name (Monday Night Football).

Figure 9:
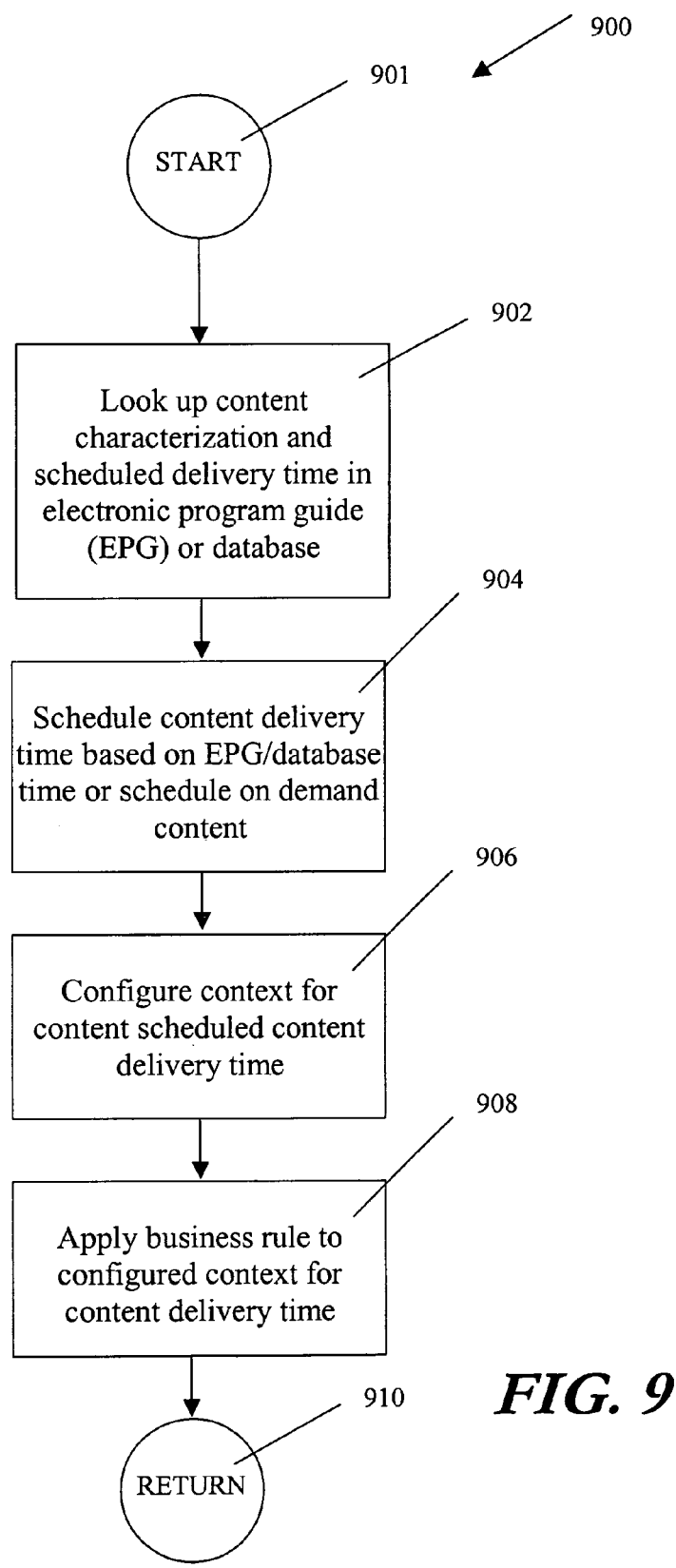

Turning now to FIG. 9, FIG. 9 is a diagrammatic representation of a method performed by a computer system in accordance with a particular illustrative embodiment. FIG. 9 is an expansion of block 824 in FIG. 8. The scenario starts at 901 by the looking up of content characterization and scheduled delivery time in an electronic program guide (EPG) or database at 902. The method schedules the content delivery time based on EPG/database time or schedules "on demand" content at block 904. The method then configures the context according to the scheduled content delivery time at block 906, and applies a business rule to configured context for content delivery time at block 908 and returns at 910.

Figure 10:
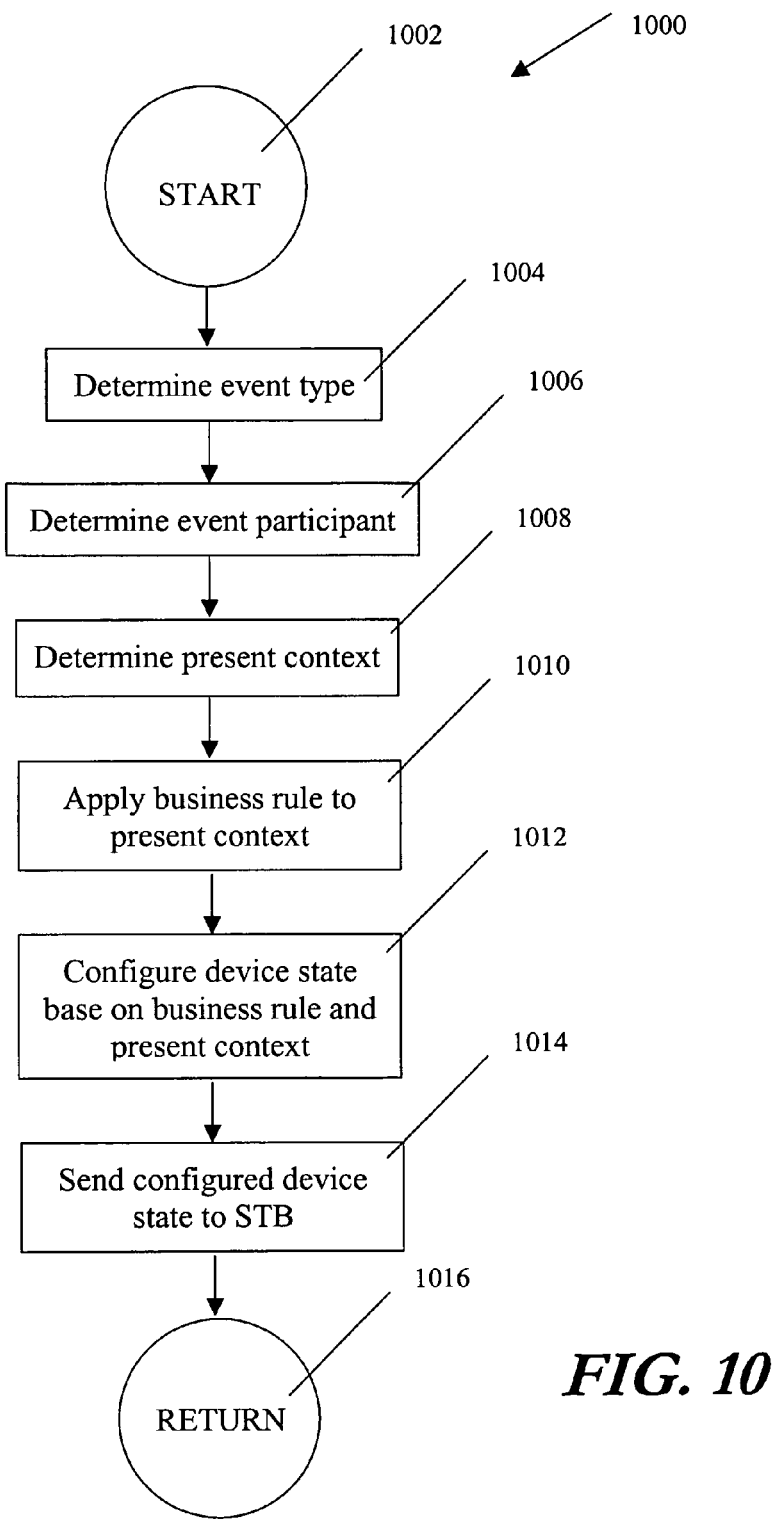

Turning now to FIG. 10, FIG. 10 is a diagrammatic representation of a method performed by a computer system in accordance with a particular illustrative embodiment. FIG. 10 is an expansion of block 822 in FIG. 8. The scenario starts at block 1002, determines event type at block 1004, determines event participant at block 1006, determines present context at block 1008, applies a business rule to present context block 1010, configures the device state based on the business rule and present context at block 1012, and sends the configured device state to STB at block 1014 and then returns at block 1016.

Figure 11:
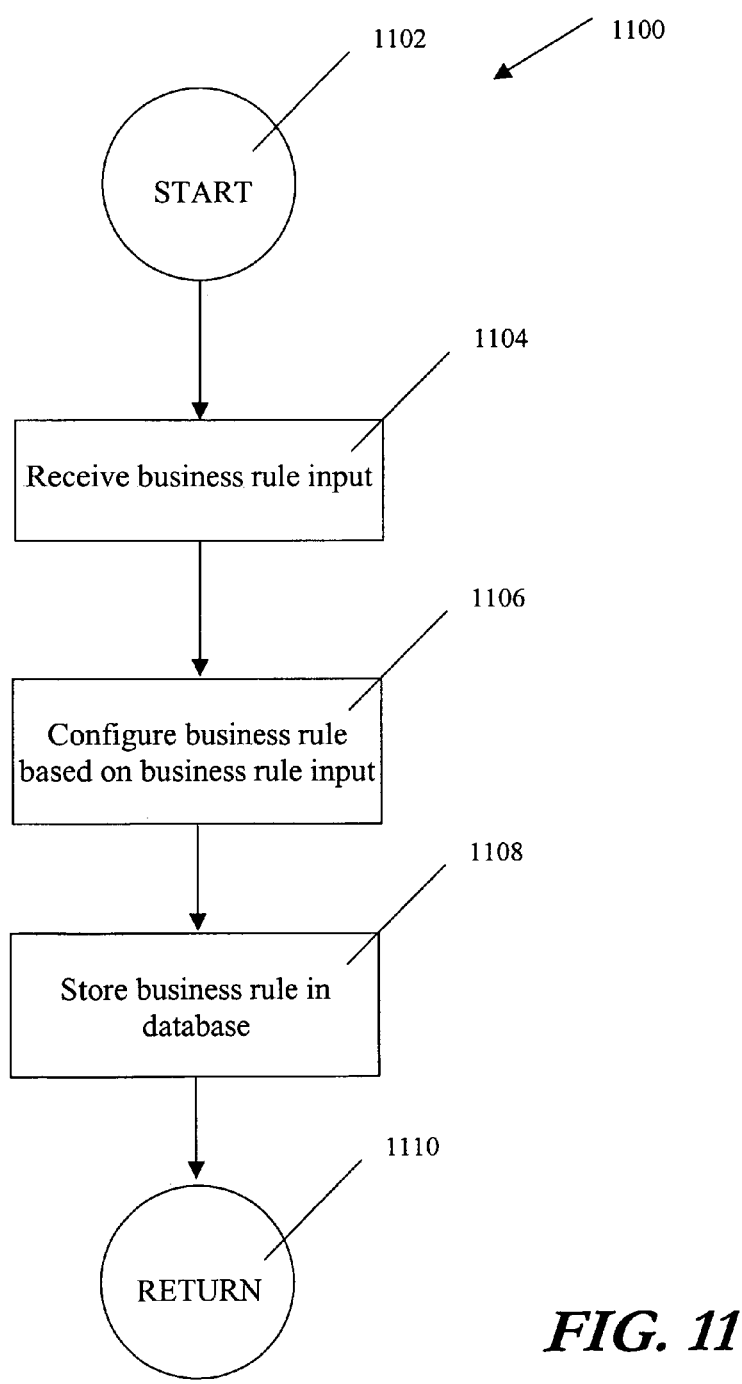

Turning now to FIG. 11, FIG. 11 is a diagrammatic flow chart representation of a method performed by a computer system in accordance with a particular illustrative embodiment. FIG. 11 is an expansion of block 820 in FIG. 8. The illustrative embodiment scenario starts at 1102, receives business rule input at block 1104, configures business rule based on business rule input at block 1106, stores business rule in database at block 1108, and then returns at block 1110.

Figure 12:
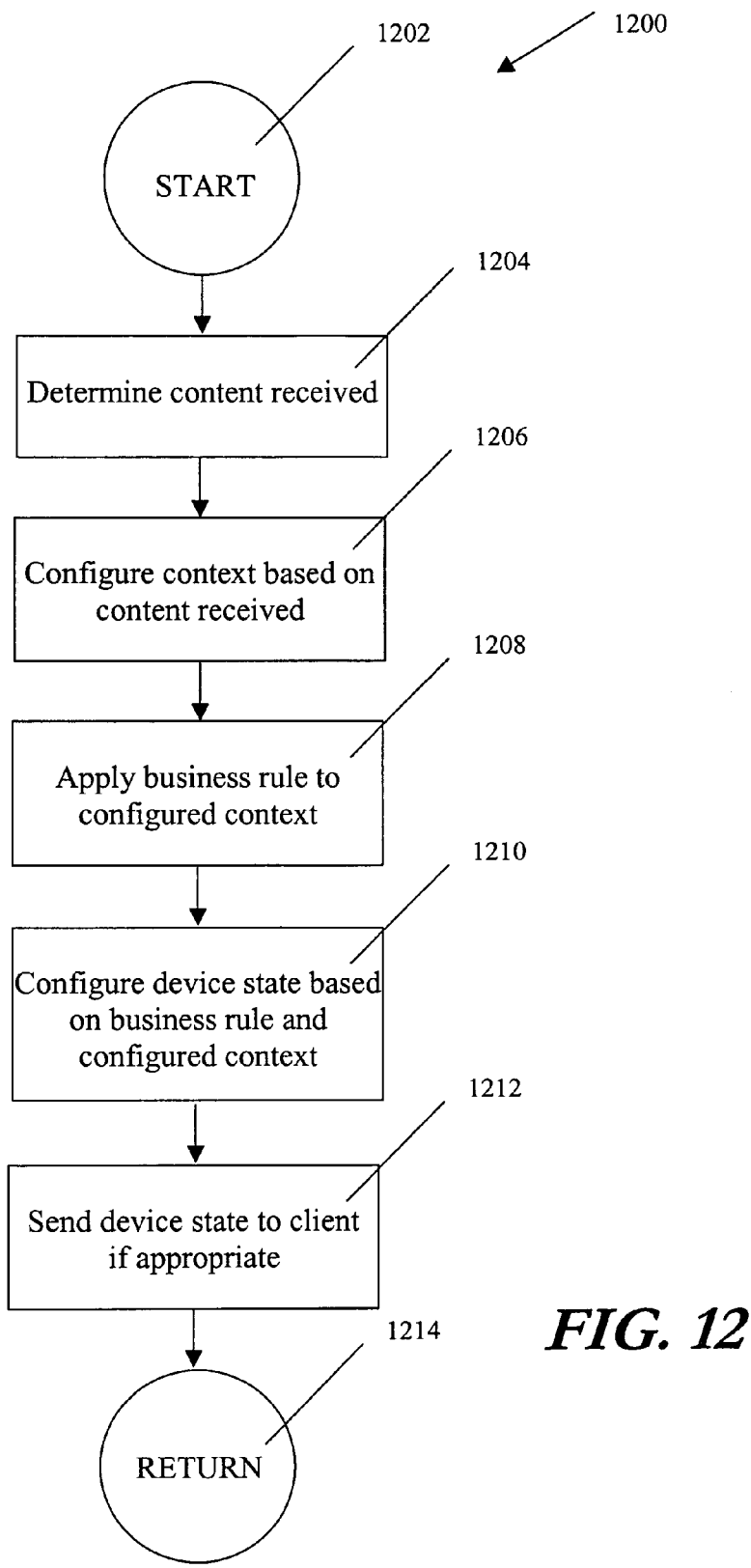

Turning now to FIG. 12, FIG. 12 is a flow chart representation of a method performed by a computer system in accordance with an illustrative embodiment. FIG. 12 is an expansion of block 818 in FIG. 8. The scenario starts 1202, determines what content is received at block 1204, configures context based on what content is received at block 1206, applies a business rule to configured context at block 1208, configures device state based on the business rule and configured context at block 1210, sends device state to client if appropriate at block 1212, and then returns at block 1214.

Figure 13:
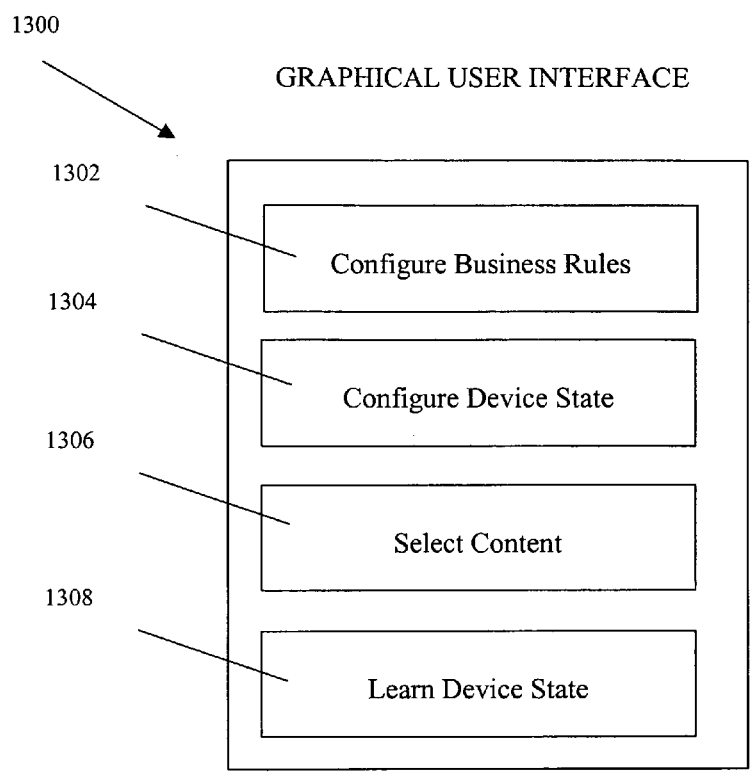
FIG. 13 is an illustration of a UI screen presenting UI data and device state in an illustrative embodiment.

Turning now to FIG. 13, FIG. 13 is a diagrammatic representation of a UI screen in accordance with an illustrative embodiment of the present invention. The GUI of FIG. 13 allows a subscriber to configure business rules at block 1302, configure device state at block 1304, select content at block 1306, and learn device state at block 1308. The business rules can be configured as entered via text input of spoken through the voice recognition system. An interpreter in the voice recognition system translates the spoken commands into executable business rules stored in the database. The device state can be configured using a GUI such as the GUI shown in FIG. 6. The content can be selected using an IPTV GUI for content selection. The learn device state icon 1208 enables a subscriber to store the current device state for the home along with the context. The context may include but is not limited to a particular subscriber, content and time of day.

Figure 14:
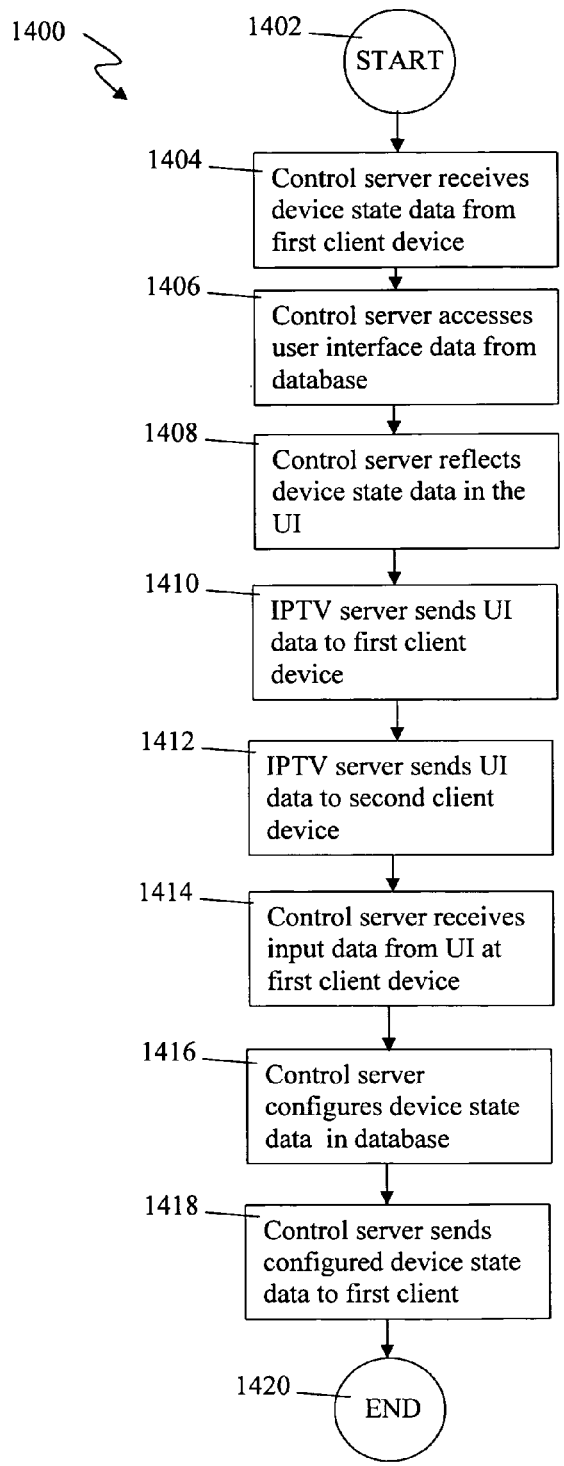
FIGS. 14-16 are flow charts illustrating methods performed in an illustrative embodiment.

Turning now to FIG. 14, FIG. 14 is a flow chart depicting a method for interacting with a controllable device in an internet protocol television (IPTV) system. A control server receives device state data from a first client device in the IPTV network at block 1404 and accesses the user interface data from the database at the control server at block 1406. The control server then represents the device state data in the UI data in the data base at block 1408. The IPTV server sends the UI data representing the device state data from the IPTV server to the first client device at block 1410. The IPTV server sends the UI data to the second client device at block 1412. The control server receives input data from the UI data presented to the user at the first client device at block 1414. The control server configures the device state data in the database at block 1416. The control server sends the configured device state data to the first client device at block 1418 and the method ends at 1420.

Figure 15:
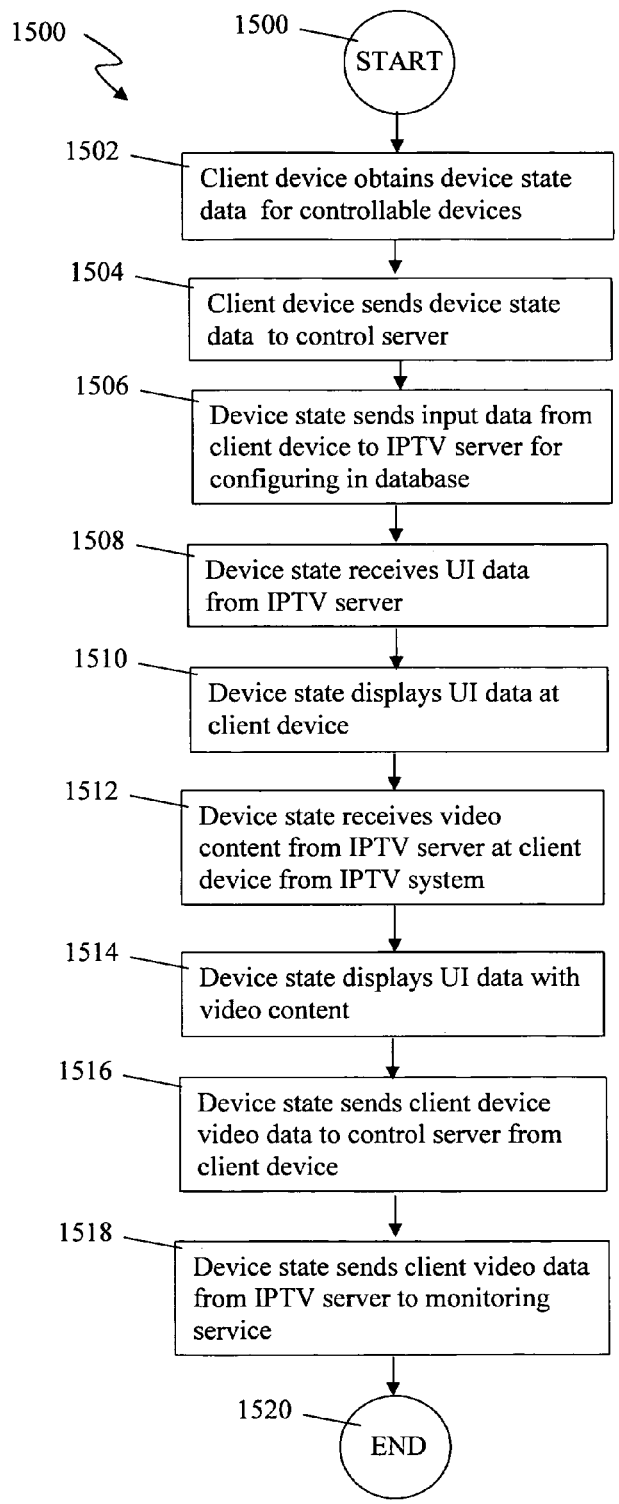

Turning now to FIG. 15, FIG. 15 is a flow chart depicting a method for configuring a device state of a home automation controllable device in an IPTV home automation system. The client device obtains device state data for controllable devices at block 1502. The client device sends device state data to the control server at block 1504. The client device sends the device state data from the client device to the IPTV server for representing the device state data in the database at block 1506. The client device receives the UI data representing the device state data from the IPTV server at block 1508. The client device displays the UI data at the client device at block 1510. The client device receives video content data from the IPTV server at the client device from the IPTV network at block 1512. The client device displays the UI data in a UI format according to the UI data with the video content data at block 1514. The client device sends client device video data to the control server from the client device at block 1516. The control server sends the client video data from the IPTV server or control server to the monitoring service at block 1518 and the method ends at block 1520.

Figure 16:
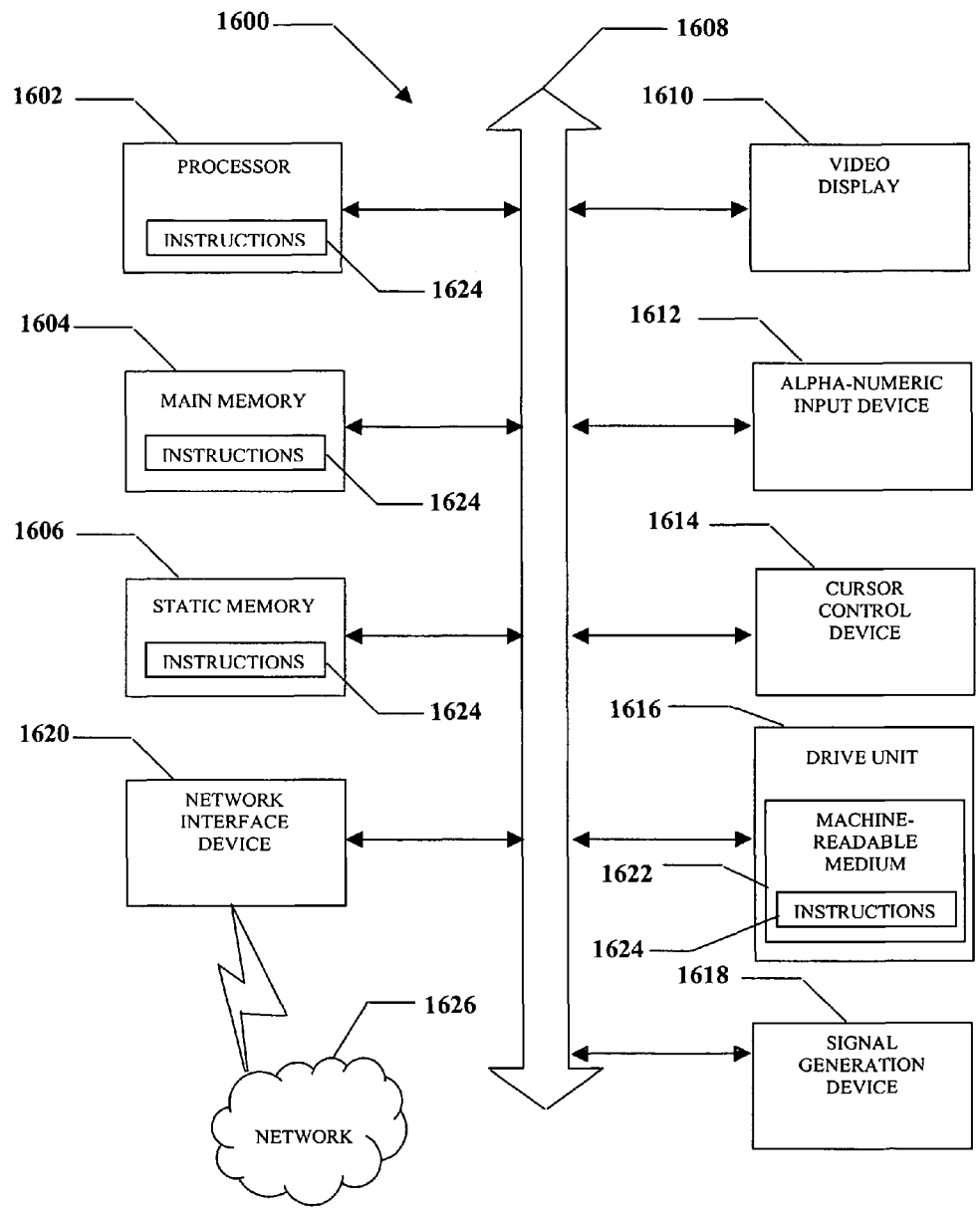

Turning now to FIG. 16, FIG. 16 is a diagrammatic representation of a machine in the form of a computer system 1600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU), or both), a main memory 1604 and a static memory 1606, which communicate with each other via a bus 1608. The computer system 1600 may further include a video display unit 1610 (e.g., liquid crystals display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1418 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated in herein above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment", merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for interacting with a controllable device in an internet protocol television system, comprising:
   receiving, at a control server at a video hub office in the internet protocol television system from an internet protocol system end user terminal client device associated with a subscriber, context data comprising device state data comprising a dimmer setting, subscriber identity and content identity read by the client device from a plurality of controllable devices, subscriber identification data and content characterization data for a video program currently being watched by the subscriber, the content characterization data comprising a content type for the video program currently being watched, wherein the content type is a content title for the video program currently being watched;
   receiving, from the end user terminal client device, subscriber activity data comprising internet protocol television user interface inputs data, alerts data, internet protocol television channel selection data, internet protocol television control inputs data, learned device state data, subscriber identity, video characterization data, video identity and internet protocol television data entry, wherein the device state data variably controls electrical power for at least one of the plurality of controllable devices wherein variable control comprises a dimmer setting at a power in between an on and off power state for the at least one of the plurality of controllable devices based on the context data indicates content identity, time, nature of content and subscriber identity, wherein the device state data further comprises refrigerator inventory data of a refrigerator;
   sending the refrigerator inventory data from the control server to the end user terminal client device for display during a commercial break in the content characterization data, wherein the commercial break is sensed in the video program currently being watched;
   accessing the device state data from a database at the control server; and
   changing the device state data for the at least one of the plurality of controllable devices to a learned device state in user interface data at the database to represent a theme comprising a device state based on the context data for the video program being watched and the subscriber identified by the subscriber identification data, the device state data and the content characterization data for the video program being watched, wherein the device state is stored in the database for future use as the theme when the context data comprising the subscriber identity and the content identity is repeated wherein the theme is overridden by an alert based on the context data.

2. The method of claim 1, wherein the context data further comprises scheduled video content time data, video content characterization data, and video event data and event participant data, wherein the device state and the context data are learned, the method further comprising applying a business rule to change the device state data based on a current context and the content characterization data received from the end user terminal client device.

3. The method of claim 1, further comprising:
   receiving, at the control server through a voice recognition system, verbal user input data representing a subscriber input selected from the group consisting of a business rule and the device state data from the end user terminal client device;
   configuring the device state data in the database in accordance with the verbal user input data; and
   sending configured device state data from the control server to the end user terminal client device.

4. The method of claim 2, wherein the content characterization data further comprises electronic program data to determine content characterization.

5. The method of claim 1, further comprising changing the device state data in accordance with a weather report in the content characterization data.

6. The method of claim 1, the method further comprising sending to a plurality of subscribers a global alert.

7. The method of claim 2, the method further comprising sending alert based video data from a controllable device camera through the control server to the end user terminal client device based on the context data wherein the alert is based the context data indicating event identity, the subscriber identity and time.

8. The method of claim 1, further comprising sending device state data between the end user terminal client device and a second client device through the control server.

9. A system for configuring a device state comprising:
   a database in a tangible computer readable medium, for storing a learned device state data for a controllable device;
   a server coupled to the database, the server comprising,
   a first server interface to send the learned device state data for a particular context from the server to a client device;

a second server interface to receive user input data, context data for the learned device state data comprising a subscriber participant identification, and content characterization data for a video program being watched by an identified subscriber participant that has been identified by the subscriber participant identification, the content characterization data comprising a content type for the video program being watched by the identified subscriber participant and a content title for the video program being watched from the client device at the server to configure the device state data in the database in accordance with a learned device state for the context based on user interface data for the video program being watched by the identified subscriber participant, the context data for the video program being watched, subscriber activity data comprising internet protocol television user interface inputs data, device state data wherein the device state data variably controls the controllable device as to direction, speed and power wherein variable control for power comprises a dimmer setting at a power in between an on and off power state for the controllable device, subscriber participant identification data, alerts data, internet protocol television channel selection data, internet protocol television control inputs data and internet protocol television data entry and the content characterization data for the video program being watched by the identified subscriber participant; and a third server interface to send configured device state data from the server to the client device to adjust the device state for the video program being watched by the identified subscriber participant, wherein the device state data further comprises refrigerator inventory data of a refrigerator, and the refrigerator inventory data is sent from the server to the client device for display during a commercial break in the content characterization data, wherein the commercial break is sensed in the video program currently being watched.

10. The system of claim 9, wherein the context data further comprises global alert data, current content data, and scheduled content data, the system further comprising a fourth server interface to apply a business rule to the user input data, context data and content characterization data for selecting a device state for the controllable device based on a current context.

11. A method of configuring a device state of a controllable device in an internet protocol television network, comprising:

reading directly from a plurality of controllable devices at an internet protocol television system terminal node client device, learned device state data for context data, the learned device state data comprising device state data wherein the device state data variably controls electrical power to the controllable device wherein variable control comprises a dimmer setting at a power in between an on and off power state for the controllable device and content characterization data for a plurality of controllable devices associated with the internet protocol television system terminal node client device, the content characterization data further comprising subscriber identification for a video program being watched by a subscriber identified by the subscriber identification, a content type and a content title for the video program being watched by the subscriber identified by the subscriber identification, wherein the device state data further comprises refrigerator inventory data of a refrigerator;

sending, from the internet protocol television system terminal node client device, the context data and subscriber activity data comprising internet protocol television user interface inputs data, device states data, subscriber identification data, alerts data, internet protocol television channel selection data, internet protocol television control inputs data and internet protocol television data entry;

sending the device state data, the context data and the content characterization data to a control server from the internet protocol television system terminal node client device;

sending the refrigerator inventory data from the server to the internet protocol television system terminal node client device for display during a commercial break in the content characterization data, wherein the commercial break is sensed in the video program currently being watched;

sending verbal user input data from the internet protocol television system terminal node client device to an internet protocol television server for configuring the device state data in a database in accordance with the user input data;

receiving, from the internet protocol television server at the internet protocol television system terminal node client device, a configured device state data, when the context data indicates a particular context exists; and changing the device state for at least one of the plurality of controllable devices based on the configured device state data received at the internet protocol television system terminal node client device for the video program being watched.

12. The method of claim 11, the method further comprising displaying the device state data in a pop up window on a display associated with the internet protocol television system terminal node client device.

13. The method of claim 11, further comprising sending the device state data to the control server.

14. A system for configuring a device state of a controllable device comprising:

a communication link providing communication to the controllable device;

a client device in communication with the communication link to the controllable device, the client device comprising:

a tangible computer readable storage medium comprising a database;

a processor, coupled to the database;

a first processor interface to send learned device state data wherein the learned device state data is learned for a particular context and variably controls electrical power for the controllable device wherein variable control comprises a dimmer setting at a power in between an on and off power state for the controllable device, context data comprising participant identification data, and content characterization data comprising a content type selected from sports, news and movies, and a content title for the controllable device to a first server;

a second processor interface configured to send data representing verbal user input data to the client device to the first server to configure device state data in the database at a second server in accordance with the verbal user input data, wherein the device state data further comprises refrigerator inventory data of a refrigerator, the refrigerator inventory data sent from the first server to the client device for display during a commercial break sensed in a video program currently being watched; and a third processor interface to receive configured device state data from the second server at the client device.

15. The system of claim 14, further comprising a fourth processor interface for sending the configured device state data to the second server.

16. The system of claim 14, further comprising a fifth processor interface for monitoring data representing the device state for the controllable device over the communication link.

17. The system of claim 14, further comprising a sixth processor interface for accepting input from a remote control.

* * * * *